US012288449B2

(12) United States Patent
Froy, Jr. et al.

(10) Patent No.: US 12,288,449 B2
(45) **Date of Patent: *Apr. 29, 2025**

(54) ESCAPE ROOM GAMING SYSTEMS AND METHODS

(71) Applicant: IGT, Las Vegas, NV (US)

(72) Inventors: David Froy, Jr., Lakeville-Westmorland (CA); Stefan Keilwert, St. Josef (AT)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/605,242

(22) Filed: Mar. 14, 2024

(65) Prior Publication Data

US 2024/0257617 A1 Aug. 1, 2024

Related U.S. Application Data

(63) Continuation of application No. 17/213,499, filed on Mar. 26, 2021, now Pat. No. 11,967,211.

(51) Int. Cl.
*A63F 9/00* (2006.01)
*G07F 17/32* (2006.01)

(52) U.S. Cl.
CPC ........ *G07F 17/3295* (2013.01); *G07F 17/323* (2013.01); *G07F 17/3239* (2013.01); *G07F 17/3262* (2013.01); *G07F 17/3274* (2013.01)

(58) Field of Classification Search
CPC ...... G07F 17/3295; A63F 9/0078; A63F 9/24; A63F 2011/009
See application file for complete search history.

(56) References Cited

U.S. PATENT DOCUMENTS

| | | | | |
|---|---|---|---|---|
| 6,675,538 | B2 | 1/2004 | Candio | |
| 7,749,089 | B1 * | 7/2010 | Briggs | A63F 13/23 472/136 |
| 8,262,445 | B1 | 9/2012 | Spigner | |
| 11,967,211 | B2 | 4/2024 | Froy, Jr. et al. | |
| 2004/0204228 | A1 | 10/2004 | Walker et al. | |
| 2016/0089610 | A1 * | 3/2016 | Boyle | A63G 25/00 463/7 |

(Continued)

FOREIGN PATENT DOCUMENTS

| | | | | |
|---|---|---|---|---|
| GB | 2578285 | | 5/2020 | |
| GB | 2578285 A | * | 5/2020 | A63F 13/79 |

OTHER PUBLICATIONS

Official Action for U.S. Appl. No. 17/213,499, dated Feb. 3, 2023 16 pages.

(Continued)

*Primary Examiner* — Jasson H Yoo
(74) *Attorney, Agent, or Firm* — Sheridan Ross P.C.

(57) ABSTRACT

The present disclosure relates generally to an escape room game that includes a plurality of puzzles corresponding to different solutions to be solved by a player in a specific order and within a predetermined period of time and in a room with defined boundaries for successful completion of the escape room game. The players can wager on a predicted level of performance of the player in the escape room game. Awards are provided by the gaming system based on the wagers and an actual level of performance of the player in solving one or more of the puzzles.

20 Claims, 8 Drawing Sheets

(56) References Cited

U.S. PATENT DOCUMENTS

| | | | |
|---|---|---|---|
| 2018/0078848 | A1 | 4/2018 | Henrie et al. |
| 2020/0111325 | A1 | 4/2020 | Lockton et al. |
| 2020/0360826 | A1 | 11/2020 | Schmidt |
| 2021/0220714 | A1 | 7/2021 | Schmidt |
| 2021/0220725 | A1 | 7/2021 | Schmidt |

OTHER PUBLICATIONS

Official Action for U.S. Appl. No. 17/213,499, dated Aug. 17, 2023 19 pages.

Notice of Allowance for U.S. Appl. No. 17/213,499, dated Dec. 14, 2023 9 pages.

* cited by examiner

ESCAPE ROOM GAMING SYSTEMS AND METHODS

CROSS REFERENCE TO RELATED APPLICATION

The present application is a continuation of and claims priority to U.S. application Ser. No. 17/213,499, filed on Mar. 26, 2021 the entire disclosure of which is hereby incorporated by reference.

BACKGROUND

The present disclosure is directed generally towards gaming systems and devices and, in particular, escape room gaming systems and devices.

An escape room, or escape game, is a game in which a team of players cooperatively discover clues, solve puzzles, and accomplish tasks in one or more rooms to progress and accomplish a specific goal in a limited amount of time. The goal is often to escape from the site of the game.

The participants in an escape room normally play as a cooperative team. Escape room games commonly have a theme and are set in a variety of fictional locations as the room. The player's goals and challenges they encounter usually follow the theme of the room.

The game commonly begins with a brief introduction, such as by video, audio or gamemaster, to the rules of the game. After this, the clock is started, and players have 45 to 60 minutes to complete the game. During this time, players explore the room and its furnishings, find clues, and solve puzzles that allow them to progress further in the game. If a team gets stuck, the players can ask for a hint delivered using paper, video, audio, or the gamemaster.

BRIEF SUMMARY

In certain embodiments, the present disclosure relates to a method, comprising: (a) creating, by a gaming system, an escape room game, the escape room game comprising a plurality of puzzles corresponding to different solutions to be solved by a player, wherein play of a first puzzle of the plurality of puzzles depends upon a prior successful solution of a second puzzle by the player, and wherein the player solves the plurality of puzzles in a room with defined boundaries; (b) receiving, by the gaming system, an electronic message comprising an indication of consideration for occurrence of a first predicted level of performance of the player in the escape room game; (c) initiating, by the gaming system, the escape room game; (d) determining, by the gaming system, an award based on the indication of consideration in the electronic message and an actual level of performance of the player in solving one or more of the plurality of puzzles; and (e) adjusting, by the gaming system, a value in an electronic record associated with an account of the player to reflect the award.

In some embodiments, the present disclosure also relates to a system, comprising: a processor; and a computer-readable storage medium, coupled with the processor, comprising processor-executable instructions that, when executed by the processor, cause the processor to: (a) provide an escape room game, the escape room game comprising a plurality of puzzles corresponding to different solutions to be solved by a player in a specific order for successful completion of the escape room game, and wherein the player solves the plurality of puzzles in a room with defined boundaries; (b) receive an electronic message comprising an indication of consideration for occurrence of a first predicted level of performance of the player in the escape room game; (c) initiate the escape room game; (d) determine an award based on the indication of consideration in the electronic message and an actual level of performance of the player in solving one or more of the plurality of puzzles; and (e) adjust a value in an electronic record associated with an account of the player to reflect the award.

In some embodiments, the present disclosure also relates to a server, comprising: a communication interface that facilitates machine-to-machine communications with a plurality of gaming devices; a processor coupled to the communication interface; and a computer-readable storage medium, coupled with the processor, comprising instructions that are executable by the processor, wherein the instructions comprise: (a) provide, to a selected gaming device of the plurality of gaming devices, an escape room game, the escape room game comprising a plurality of puzzles corresponding to different solutions to be solved by a player in a specific order and within a predetermined period of time for successful completion of the escape room game, and wherein the player solves the plurality of puzzles in a room with defined boundaries; (b) receive, from the selected gaming device, an electronic message comprising an indication of consideration for occurrence of a first predicted level of performance of the player in the escape room game; (c) cause the selected gaming device to initiate the escape room game; and (d) adjust a value in an electronic record associated with an account of the player to reflect an award based on the indication of consideration in the electronic message and an actual level of performance of the player in solving one or more of the plurality of puzzles.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

An Electronic Gaming Machine (EGM) as used herein refers to any suitable electronic gaming device which enables a player to play a game (including but not limited to a game of chance, a game of skill, and/or a game of partial skill) to potentially win one or more awards, wherein the EGM comprises, but is not limited to: a slot machine, a video poker machine, a video lottery terminal, a terminal associated with an electronic table game, a video keno machine, a video bingo machine located on a casino floor, a sports betting terminal, or a gaming device.

An Electronic Gaming Table or Electronic Table Game (EGT) as used herein refers to a gaming device in the form of a table that enables a player to play a game (including but not limited to a game of chance, a game of skill, and/or a game of partial skill), such as roulette, poker, blackjack or Baccarat, to potentially win one or more awards. There can be multiple player seats in the electronic gaming table for tournament or side game play, and each player can operate or play the game in the electronic gaming table.

A Video Gaming Machine (VGM) is a type of EGM that extensively uses multimedia rather than mechanical modalities for the gaming experience. For example, a video slot machine does not use mechanical reels, and instead uses graphical reels on a computerized display. As there are no mechanical constraints on the design of video slot machines, games often use at least five reels, and may also use non-standard layouts.

A Virtual Reality ("VR") gaming machine as used herein refers to a gaming device that enables virtual reality gaming, or the application of a three-dimensional (3-D) artificial environment to a computer game. Virtual reality environments are created with VR software and presented to the user in such a way that VR environment supersedes the real-world environment, helping the user experience the VR environment as real. A VR game might involve a 3-D image that can be explored interactively on a computing device by manipulating keys, a mouse or touchscreen. More sophisticated and immersive examples include VR headsets, wrap-around display screens and VR rooms augmented with wearable computers and sensory components, such as scents and haptics devices for tactile feedback.

An Augmented Reality ("AR") gaming machine as used herein refers to a gaming device that provides an interactive gaming experience of a real-world environment where the objects that reside in the real world are enhanced by computer-generated perceptual information, sometimes across multiple sensory modalities, including visual, auditory, haptic, somatosensory, and olfactory modalities. AR can be defined as a system that fulfills three basic features: namely a combination of real and virtual worlds, real-time interaction, and accurate 3D registration of virtual and real objects. The overlaid sensory information can be constructive (i.e. additive to the natural environment), or destructive (i.e. masking of the natural environment). This experience is seamlessly interwoven with the physical world such that it is perceived as an immersive aspect of the real environment. In this way, augmented reality alters one's ongoing perception of a real-world environment, whereas virtual reality completely replaces the user's real-world environment with a simulated one. Augmented reality is related to two largely synonymous terms: mixed reality and computer-mediated reality.

A "gaming system" as used herein refers to various configurations of: (a) one or more central servers, central controllers, or remote hosts; (b) one or more gaming devices such as those located on a casino floor; and/or (c) one or more personal gaming devices, such as desktop computers, laptop computers, tablet computers or computing devices, personal digital assistants, mobile phones, and other mobile computing devices.

A "puzzle" refers to is a game or problem that tests a person's ingenuity or knowledge. In a puzzle, the solver is expected to put pieces together in a logical way, to arrive at a predetermined solution of the puzzle.

Additional features and advantages are described herein and will be apparent from the following Description and the figures.

DETAILED DESCRIPTION

Figure 1:
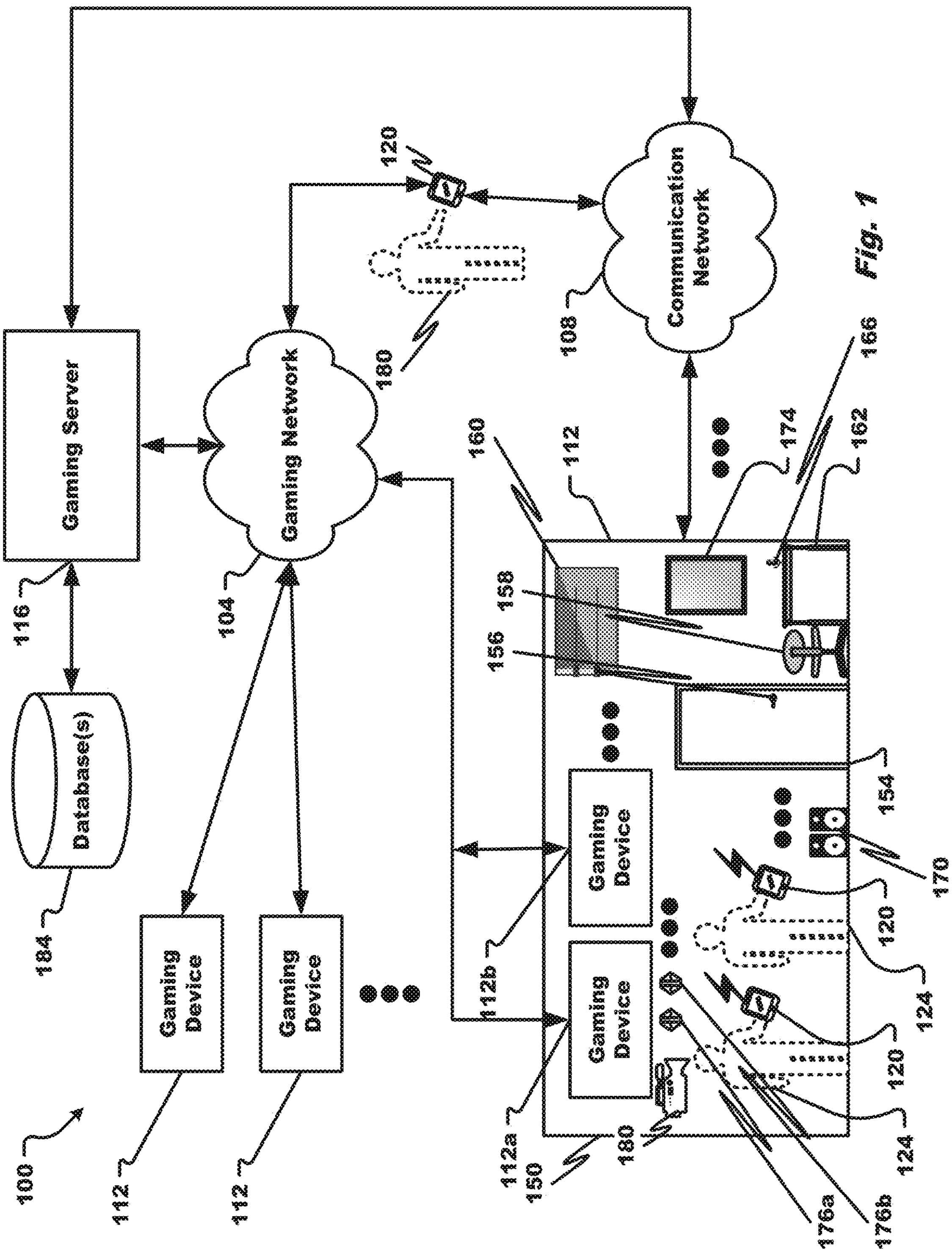
FIG. 1 illustrates a gaming system for providing an escape room game in accordance with embodiments of the present disclosure.

The escape room game of the present disclosure can comprise a plurality of electronic puzzles corresponding to different solutions to be solved by one or more players in a virtual, physical or mixed reality escape room with defined spatial boundaries (e.g., escape room). Play of a first puzzle can depend upon a prior successful solution of a second puzzle by the player. Stated differently, the puzzles must be completed in a specific order for the escape room game to constitute a winning outcome for the players. The players can, individually or collectively, generate electronic message(s) comprising an indication of consideration, such as a wager or bet, for occurrence of a first predicted level of performance of the player(s) in the escape room game. The first predicted level of performance can be based on any parameter associated with the escape room game, such as a time to complete a selected puzzle of the plurality of puzzles, a time required to complete the plurality of puzzles, and a number of attempts to solve the selected puzzle or plurality of puzzles. The gaming system determines an award based on the indication of consideration and an actual level of performance of the player(s) in solving one or more of the puzzles and adjusts a value in an electronic record associated with an account of the player(s) to reflect the award.

The escape room configuration and puzzles can be related to, or share, a common theme or concept. Exemplary themes include escape from imprisonment or a dungeon, rescue of a person from a life-threatening situation, investigation or prevention of a crime, solve a mystery, defuse a bomb, find a missing person, find a cure, solve a formula, haunted house, science fiction (e.g., steampunk), or spy or espionage. The escape room configuration is configured for the theme shared with the puzzles, such as a letter room, crime scene, jail cell, dungeon, space station or spaceship, a vehicle (e.g., a ship, car, train or tram, truck, airplane, etc.) or other location having defined spatial boundaries. Generally, escape rooms having different themes but a common set of puzzles and game elements will provide outputs to players differing in one or more of visual, auditory, haptic, somatosensory, or olfactory player feedback.

The gaming system can establish a predetermined time in which to solve each puzzle, a group of the puzzles, or the entire game. The predetermined time can be the sum of individual times predetermined to solve each of the component puzzles or a time based upon another set of parameters or variables, such as a difficulty level assigned to the escape room game or the component puzzles.

During the escape room game, the player(s) can have restricted access from the defined boundaries or escape room in which the player(s) are located with a series of puzzles, which need to be completed in a specific or predetermined order. The restricted access can include a locked door, window, or other point of entry. Solving timely the series of puzzles in the specific order can cause gaming system to unlock the room. At the successful or unsuccessful conclusion of the escape room game, the restricted access can be removed, such as by unlocking, or deactivating, an electromechanical lock, to provide unrestricted access to and from the escape room. The lock can be remotely unlocked in case of an emergency.

In determining the award, the gaming system can determine an actual level of performance of the player(s) in solving one or more of the puzzles by a number of techniques. For example, the gaming system can determine a relative contribution of each of the plurality of players to completing each of the plurality of puzzles, with the award of each player being based on a relative contribution of the player to completing each of the plurality of puzzles. In some embodiments, the players, at the beginning of the escape room game, are prompted to choose a difficulty level of the escape room game which is used by the gaming system to determine a highest possible win amount of the escape room game. Generally in the event of a winning outcome, the better that the player(s) perform in the escape room game (e.g., the faster the escape room game, puzzle, or game element is completed or the fewer number of tries are required for completion) means the higher the win amount; likewise, the worse that the player(s) perform in the escape room game (e.g., the slower the escape room game, puzzle, or game element is completed or the larger the number of tries are required for completion) means the lower the win amount. The computerized nature of the escape room game can allow the gaming system to readily vary the setup or gameplay difficulty of the game based on the target difficulty level for the game. The gaming system can be capable of assessing the difficulty level of each task, quest, game element, and/or puzzle in the game and dynamically combine them to match a player selected difficulty level. The gaming system can also alter the difficulty level of a puzzle or game element and consequently the payout table during the escape room game in the event that the player(s) are struggling with solving one or more puzzles or game elements.

The players can request, or be offered by the gaming system, a hint to assist in solving a puzzle. The hint may be obtained by the players using credits, placing further wagers, agreeing to a reduced award or less favorable winning odds, or using some other item of value.

Each of the players can have a player profile maintained by the gaming system. The player profile(s) can include an overall score corresponding to a rank of the player relative to other players. The gaming system can adjust a difficulty level of a selected puzzle or group of puzzles in the escape room game or the award amount based on the individual or collective (e.g., mean, median or modal) ranking of the players. The gaming system can also use the player profiles to adjust the difficulty level of a selected puzzle or group of puzzles for a subsequent escape room game involving different players. In other words, the gaming system can adjust a difficulty level of a selected puzzle or group of puzzles used in the escape room game based on a prior interaction of a different player with the selected puzzle. The gaming system's assessment of a difficulty level of puzzle elements can be done dynamically based on a set of criteria (e.g. time until solved, tries until solved, etc.).

In some embodiments, user or player accounts can track player rankings and/or have an overall score on how well they have ranked. A high scoring player could be invited to tournaments which would have the best players play against each other. Player ranking can also be used to auto adjust the difficulty of the puzzles per player so that the players have a more even playing experience. Prize amounts can also be adjusted based upon ranking to help adjust player payouts. A shared progressive could be awarded to the player with the highest ranking.

In some embodiments, the player ranking or overall score for a group of players depends directly on the player rankings or overall scores of the members of the group of escape room players. The functional relationship can take many forms, such as a simple weighted or unweighted arithmetic sum or average, median or mode of the player rankings or overall scores of the different member players or the highest value of the player rankings or overall scores of the different member players.

In some embodiments, the characteristics of a group of players are determined by combining the selected player profile field values or characteristics for the individual players in the group. The algorithm employed in combing or aggregating the player profile characteristics can take many forms, such as, for each selected field or characteristic of the player profile(s), computing a simple weighted or unweighted arithmetic sum or average, median or mode of the selected player field values or characteristics of the different member players or the highest value of the selected player field or characteristic of the different member players. Stated differently, a first player profile characteristic (e.g., difficulty levels of puzzles completed by the player individually or as part of a team) of all of the players can be aggregated as a first player profile characteristic for the entire group of players.

The gaming system can use methodologies for determining payouts that are similar to those employed for other gaming machines, such as slot machines, using one or more payout tables. For example, each puzzle and/or game element in the puzzle can have its own payout table. Rather than the payout table being based on slot machine symbol combination outcomes, the payout table can be based on an amount of time and/or number of attempts to solve the puzzle or game element. The payout tables may be used for wagers on a puzzle or game element-basis or combined into a master payout table for wagers on multiple puzzles of the entire escape room game.

The gaming system can provide the escape room game as a predetermined sequence of puzzles developed before the game starts or create the game in substantial real time as the players progress through the sequence of puzzles (e.g., the gaming system creates a next puzzle when a prior puzzle is at or near a selected stage of completion). Regardless of the timing of game creation, the gaming system can create the game by selecting each of the puzzles from a set of puzzles, each of the puzzles comprising a corresponding solution for puzzle completion, a credit amount associated with puzzle completion, a predetermined period of time for puzzle completion, and a difficulty level of the respective puzzle. The credit amount and predetermined period of time for puzzle completion are commonly directly related to the difficulty level of the respective puzzle.

The gaming system can alternatively or additionally procedurally create the puzzles from a pool or plurality of game elements. For example, the gaming system can select a game element from a plurality of game elements, each of the game elements of the plurality of game elements comprising a set of inputs that determines a difficulty measure for the respective game element, and, based on a target difficulty level for a selected puzzle and a selected theme for the escape room game, assemble a plurality of game elements to form a selected puzzle. In some embodiments, player historical play of escape room games, puzzles and/or game elements can be used to influence the generation of the puzzles and the difficulty as well as the credit amount awarded for solving puzzles. In some embodiments the escape room game remains the same but the gaming system uses various mechanisms to randomize the game elements in the puzzles presented to the player to make each escape room game unique In some embodiments, the difficulty level is defined by multiple design elements such as a given time-limit to solve the puzzle, a defined sequence of actions in the escape room game (e.g., unlock a vault), a required combination of game elements in the escape room game. and a hint system for the player, which helps the player to solve the puzzle depending on the difficulty level.

In some embodiments, the difficulty level of the escape room game depends directly on the difficulty levels of the component puzzles and the difficulty level of each component puzzle depends directly on the difficulty levels of its component game elements. The dependent relationship can be expressed in many forms, such as a simple weighted or unweighted arithmetic sum or average, median or mode for the escape room game, of the difficulty levels of the component puzzles or, for each puzzle, of the difficulty levels of the component game elements. Alternatively, the dependent relationship can be expressed, for the escape room game, as the highest value of the difficulty levels of the component puzzles or, for each puzzle, as the highest value of the difficulty levels of the component game elements.

In some embodiments, the puzzles have different requirements to solve, such as shapes, colors, sounds, patterns, tilting, rotating, gestures, and the like, that will be generated using a procedural generation algorithm. The algorithm can use historical data to determine how hard a puzzle will be based upon completion of previous attempts by other players. This can be used to determine the credit amount given to a puzzle and time to completion for the prize amounts. Some puzzles use combination locks with a tumbler, locked drawers where a key is needed, hidden objects in hollowed out books, books that are used as a switch, hidden switches on objects, logic puzzles using math or riddles, and the like. Other puzzles use text, audio, lighting, shadows, keys or other pieces to give hints for solutions or as needed for a next puzzle. Other puzzles can use liquids to be poured out or solids to be put into containers to solve the puzzle. Weight sensors can be used with WIFI or Bluetooth for measuring the fluid or solid amounts. Each puzzle will have a small microprocessor as well as sensor's which are used for the puzzle. The puzzles will connect wirelessly to a game server which will run the game instance.

The player or the personal gaming device of the player can be registered with a gaming device in the escape room or otherwise with the gaming system, such as using a kiosk. When a player goes to the venue, they are able to sign up on a kiosk or on a personal gaming device. They can sign up with a group, or be added to an existing open group. Once the user is registered, they will be sent a notification that they are ready to take part.

The registered personal gaming device of the player can be controlled by the gaming system to receive information about the player's actions (e.g., as a sensing node to monitor the player's contribution to a solution of each puzzle or other game event) and/or as a gaming device that can perform an action during the game. By way of example, the gaming device or gaming system can pair with a personal gaming device of a selected player, receive user input from the selected player to perform an activity in the escape room game, in response, perform, on behalf of the selected player, the activity in the escape room game, and determine an overall score for the plurality of players as a function of the overall score of each of the plurality of players. In some embodiments, players use multiple mobile devices concurrently to solve one or more puzzles by working with other players. In some embodiments, gameplay is cooperative so that players use their own personal gaming devices to help each other out, or one user controls the gaming device while another player controls the puzzle with his or her mobile device.

In some embodiments, the puzzles are solvable on or using the user's personal gaming device. The device could use the touch screen to activate an activity, such as prompting the user to use different interaction modes to perform an action. The user can tip his or her personal gaming device to pour a liquid into a virtual container on the personal gaming screen. The user could use the personal gaming device as a magnifying glass to read small print or to look for hidden clues. The user could have different color bands on the personal gaming device for infrared, ultraviolet, and other reflected light types to do a search for hidden information and clues.

The gaming system can stream audio and/or video of the escape room game to other third party (or non-player) gaming or personal gaming devices. In response, the gaming system can receive wager(s) from the third party gaming or personal gaming devices regarding the occurrence of a second predicted level of performance of the player in the escape room game. The first and second predicted levels of performance can be the same or different. Streaming the escape room game during gameplay can enable community shared bonus rounds where other observers are able to backwager on the participants as well as provide support for mini wagers to be performed while the game is proceeding. In some embodiments, the escape room game is streamed on the Internet for other non-players to watch and possibly wager on the progress of the escape room game. In some embodiments, other players or non-players use virtual reality ("VR") to appear as an avatar and watch in real time the players completing the puzzles for the escape room game. The other players or non-players can also place wagers during the game. The avatar could jump from player to player during the game to monitor game progress and also collect information on how, upon which player, and how much to wager.

While players are participating in the escape room, the gaming system thus enables observers to watch the events and place wagers on players or player rankings using a connect personal gaming application. The observers can place mini wagers on the events of the escape room, such as time to complete each objective, time to exit the room, number of tries per puzzle, and the like. Wagers can be booked before the escape room game begins, but small mini wagers can be placed during gameplay.

In some embodiments, non-players observing the streaming video of the escape room game can send hints to the players in a cooperative mode of gameplay. In this feature, non-players, like the players, can pay for the opportunity to provide hints, such as using accrued game credits, placing wagers or wagers of higher amounts, and/or agreeing to a reduced payout. Players and non-players giving hints could be given likes, dislikes, or other indications of social status to help increase the number of non-player participants.

The escape room game can use mixed reality and/or virtual reality, such as provided by Virtual Reality ("VR") gaming machine, Augmented Reality ("AR") gaming machine, and/or Video Gaming Machine (VGM), to enhance the player's experience. In an exemplary mixed solution, the player wears a virtual reality headset and/or appears as an avatar in virtual reality giving instructions to other players in a physical escape room, or a player in the real world gives instructions to other players wearing virtual reality headsets and/or appearing as avatars in a virtual reality escape room. With mixed reality, the players can view overlays of virtual puzzles in the real world or interact with pure virtual objects. The virtual or mixed reality headset can be connected to the gaming device, player's personal gaming device, gaming system, or be self-contained.

The escape room game can be provided as augmented by a base (or main) or bonus (or secondary) game different from the escape room game. The base or bonus game, for example, can be a game, such as keno, a slot game, a wheel game, poker, bingo, and the like. The escape room game, for instance, can be a bonus game triggered by an outcome (e.g., payline result) of a base game. Hints can also be provided as bonuses of other base or bonus games, such as a slot game based on a payline result.

In other examples, mechanics, concepts, and/or rules of an escape room game are incorporated into a base game or bonus game.

In one implementation, an escape room puzzle can be incorporated into a bonus game of a slot game. In one implementation, the slot game player finds himself in a second screen game in an escape room, such as in a dungeon, and is asked to solve a puzzle, such as pick lock a treasure chest to receive an award. The second screen game or bonus game can be triggered by a predetermined payline result of the slot game (e.g., a particular order or distribution of game symbol types such as a Hit 3 BN or Scatter) or upon some other criterion, such as a wager or side wager of the player, a credit balance of a player, and the like. The payline result can determine not only the bonus game award but also one or more other parameters of the bonus game, such as a number of hints, a number of tries to solve a puzzle, and the like. In this implementation, the escape room game mechanics, concepts and/or rules discussed herein are incorporated into the bonus game. The transition from the base game into the bonus game can be, by way of illustration, fading out of the slot game reels and symbols followed by opening and closing of an escape room door 154. The slot game player can then interact with the main screen of the slot game, and the gaming device 112 can provide one or more hints to look at the button panel. The hints can be provided as information displayed on the top screen of the gaming device 112, or even the lighting on the edge of the cabinet of the gaming device 112. To solve the puzzle, the player must interact with the different components of the gaming device 112. Alternatively, a portable gaming device 120 of the player can be paired with the gaming device or server to provide, by the portable gaming device 120, the second screen transition. Some of the bonus features can be on the main screen of the gaming device 112, and other bonus features can be provided by the portable gaming device 120. When the player has completed the (final) puzzle or gaming element and the bonus game is over, the player can transition from the escape room game, such as by a game over screen, to the main game.

In another implementation, the base game can include one or more game elements to teach the player escape room game skills and prepare the player for an escape room game and/or increase player excitement for the escape room game. In one example, the player during the base slot game is prompted to select one or more symbol positions in a reel matrix. Then the reels spin. If a predefined symbol combination lands in the pre-selected symbol position(s), the "puzzle" is solved and the player receives an award.

The escape room game feature in computer-enabled gaming can address a variety of technical problems, including how to attract the attention of a player and have that player choose to interact with a gaming system, how to provide an improved gaming experience such as by providing a player team-based skill-based game, and/or with enhanced entertainment opportunities. Escape room games can not only provide an enhanced gaming experience to increase player excitement and casino revenue but also appeal to younger generations of players who prefer skill-based games, particularly skill-based games played by a team of players. The escape room game can be virtualized and thereby able to introduce dynamic game features so that the players who enter the game a second time can encounter an entirely different game scenario and game experience. The escape room game feature can therefore present the player with higher levels of player anticipation, excitement, and satisfaction during gameplay and lead to increased play of the gaming machine.

The escape room game feature commonly is provided by a gaming system comprising multiple gaming system components. In various embodiments, the gaming system of the present disclosure includes: (a) one or more gaming devices in combination with one or more central servers, central controllers, or remote hosts; (b) one or more personal gaming devices in combination with one or more central servers, central controllers, or remote hosts; (c) one or more personal gaming devices in combination with one or more gaming devices; (d) one or more personal gaming devices, one or more gaming devices, and one or more central servers, central controllers, or remote hosts in combination with one another; (e) a single gaming device; (f) a plurality of gaming devices in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity and unless specifically stated otherwise, "EGM" as used herein represents one EGM or a plurality of EGMs, "EGT" as used herein represents one EGT or a plurality of EGTs, "VR gaming machine" as used herein represents one VR gaming machine or a plurality of VR gaming machines, "AR gaming machine" as used herein represents one AR gaming machine or a plurality of AR gaming machines, and "VGM" as used herein represents one VGM or a plurality of VGMs, "personal gaming device" as used herein represents one personal gaming device or a plurality of personal gaming devices, and "central server, central controller, or remote host" as used herein represents one central server, central controller, or remote host or a plurality of central servers, central controllers, or remote hosts. A "gaming device" as used herein may be understood to include an EGM, multiple EGMs, an EGT, multiple EGTs, a VR gaming machine, multiple VR gaming machines, an AR gaming machine, multiple AR gaming machines, a VGM, multiple VGMs, a personal gaming device, multiple personal gaming devices, a mobile device, multiple mobile devices, and combinations thereof.

As noted above, in various embodiments, the gaming system includes a gaming device in combination with a central server, central controller, or remote host. In such embodiments, the gaming device is configured to communicate with the central server, central controller, or remote host through a data network or remote communication link. In certain such embodiments, the gaming device is configured to communicate with another gaming device through the same data network or remote communication link or through a different data network or remote communication link. For example, the gaming system includes a plurality of gaming devices that are each configured to communicate with a central server, central controller, or remote host through a data network.

In certain embodiments in which the gaming system includes a gaming device in combination with a central server, central controller, or remote host, the central server, central controller, or remote host is any suitable computing device (such as a server) that includes at least one processor and at least one memory device or data storage device. As further described herein, the gaming device includes at least one gaming device processor configured to transmit and receive data or signals representing events, messages, commands, or any other suitable information between the gaming device and the central server, central controller, or remote host. The at least one processor of that gaming device is configured to execute the events, messages, or commands represented by such data or signals in conjunction with the operation of the gaming device. Moreover, the at least one processor of the central server, central controller, or remote host is configured to transmit and receive data or signals representing events, messages, commands, or any other suitable information between the central server, central controller, or remote host and the gaming device. The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the gaming device. Further, one, more than one, or each of the functions of the at least one processor of the gaming device may be performed by the at least one processor of the central server, central controller, or remote host.

In certain such embodiments, computerized instructions for controlling any games displayed by the gaming device are executed by the central server, central controller, or remote host. In such "thin client" embodiments, the central server, central controller, or remote host remotely controls any games (or other suitable interfaces) displayed by the gaming device, and the gaming device is utilized to display such games (or suitable interfaces) and to receive one or more inputs or commands. In other such embodiments, computerized instructions for controlling any games displayed by the gaming device are communicated from the central server, central controller, or remote host to the gaming device and are stored in at least one memory device of the gaming device. In such "thick client" embodiments, the at least one processor of the gaming device executes the computerized instructions to control any games (or other suitable interfaces) displayed by the gaming device.

In various embodiments in which the gaming system includes a plurality of gaming devices, one or more of the gaming devices are thin client gaming devices and one or more of the gaming devices are thick client gaming devices. In other embodiments in which the gaming system includes one or more gaming devices, certain functions of one or more of the gaming device are implemented in a thin client environment, and certain other functions of one or more of the gaming devices are implemented in a thick client environment. In one such embodiment in which the gaming system includes a gaming device and a central server, central controller, or remote host, computerized instructions for controlling any escape room games displayed by the gaming device are communicated from the central server, central controller, or remote host to the gaming device in a thick client configuration, and computerized instructions for controlling any games, escape room displayed objects, or other functions or features displayed by the gaming device are executed by the central server, central controller, or remote host in a thin client configuration.

In certain embodiments in which the gaming system includes: (a) a gaming device configured to communicate with a central server, central controller, or remote host through a data network; and/or (b) a plurality of gaming devices configured to communicate with one another through a communication network, the communication network may include a local area network (LAN) in which the gaming devices are located substantially proximate to one another and/or the central server, central controller, or remote host. In one example, the gaming devices and the central server, central controller, or remote host are located in a gaming establishment or a portion of a gaming establishment.

In other embodiments in which the gaming system includes: (a) a gaming device configured to communicate with a central server, central controller, or remote host through a data network; and/or (b) a plurality of gaming devices configured to communicate with one another through a communication network, the communication network may include a wide area network (WAN) in which one or more of the gaming devices are not necessarily located substantially proximate to another one of the gaming devices and/or the central server, central controller, or remote host. For example, one or more of the gaming devices are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the gaming devices are located. In certain embodiments in which the communication network includes a WAN, the gaming system includes a central server, central controller, or remote host and a gaming device each located in a different gaming establishment in a same geographic area, such as a same city or a same state. Gaming systems in which the communication network includes a WAN are substantially identical to gaming systems in which the communication network includes a LAN, though the quantity of gaming devices in such gaming systems may vary relative to one another.

In further embodiments in which the gaming system includes: (a) a gaming device configured to communicate with a central server, central controller, or remote host through a data network; and/or (b) a plurality of gaming devices configured to communicate with one another through a communication network, the communication network may include an internet (such as the Internet) or an intranet. In certain such embodiments, an Internet browser of the gaming device is usable to access an Internet game page from any location where an Internet connection is available. In one such embodiment, after the gaming device accesses the Internet game page, the central server, central controller, or remote host identifies a player before enabling that player to place any wagers on any plays of any wagering games. In one example, the central server, central controller, or remote host identifies the player by requiring a player account of the player to be logged into via an input of a unique player name and password combination assigned to the player. The central server, central controller, or remote host may however, identify the player in any other suitable manner, such as by validating a player tracking identification number associated with the player; by reading a player tracking card, or other smart card inserted into a card reader; by validating a unique player identification number associated with the player by the central server, central controller, or remote host; or by identifying the gaming device, such as by identifying the MAC address or the IP address of the Internet facilitator. In various embodiments, once the central server, central controller, or remote host identifies the player, the central server, central controller, or remote host enables placement of one or more wagers on one or more plays of the escape room game and plays via the Internet browser of the gaming device.

The central server, central controller, or remote host and the gaming device are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of gaming devices to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

Embodiments of the present disclosure will be described in connection with a player interacting with one or more gaming devices. It should be appreciated that a gaming device, as described herein, may include a gaming device, mobile device, server, and other computational device. While embodiments of the present disclosure will be described in connection with the example of an EGT, EGM, VR gaming machine, AR gaming machine, or VGM, it should be appreciated that embodiments of the present disclosure are not so limited. For instance, other types of computational devices, such as portable user devices, smartphones, tablets, laptops, Personal Computers (PCs), wearable devices, etc. may be configured with gaming device functionality (e.g., to implement a game of chance, a game or skill, or a hybrid game of chance/game of skill), similar to a gaming device as described herein.

With reference initially to FIG. 1, details of an illustrative gaming system 100 will be described in accordance with at least some embodiments of the present disclosure. The components of the gaming system 100, while depicted as having particular instruction sets and devices, is not necessarily limited to the examples depicted herein. Rather, a system according to embodiments of the present disclosure may include one, some, or all of the components depicted in the system 100 and does not necessarily have to include all of the components in a single device. The illustration of a single central gaming server 116 is for ease of discussion and should not be construed as limiting embodiments of the present disclosure to a single-server architecture.

The gaming system 100 is shown to include a gaming network 104 and a communication network 108. The gaming network 304 may correspond to a distributed set of devices that interconnect and facilitate machine-to-machine communications between one or multiple gaming devices 112 and the gaming server 116. The communication network 108 may correspond to a distributed set of devices that interconnect and facilitate machine-to-machine communications between the gaming server 116 and personal gaming devices 120 carried by players 124. In some embodiments, the gaming network 104 and communication network 108 may correspond to different networks administered and/or maintained by different entities. In such a scenario, one or more of a gateway, firewall, or similar network border device may reside between the gaming network 104 and the communication network 108 (e.g., to maintain security preferences/settings of each network). In another possible scenario, the gaming network 104 and communication network 108 may correspond to the same or similar network. As a non-limiting example of the second scenario, the gaming network 104 and communication network 108 may both correspond to a distributed Internet Protocol (IP)-based communication network, such as the Internet.

The gaming network 104 and communication network 108 may include any type of known communication medium or collection of communication media and may use any type of protocols to transport messages between devices. As some non-limiting examples, the gaming network 104 may correspond to a WAN or LAN in which the plurality of gaming devices 112 are configured to communicate with the gaming server 116 using devices that are owned and administered by the same entity that administers security settings of the gaming devices 112. As such, the gaming network 104 may be considered a secure or trusted network.

The communication network 108, in some embodiments, may also include a WAN or LAN. Alternatively or additionally, the communication network 108 may include one or more devices that are not administered by the same entity administering the gaming devices 112. Thus, the communication network 108 may be considered an untrusted or unsecure network from the perspective of the gaming network 104. The Internet is an example of the communication network 108 that constitutes an IP network consisting of many computers, computing networks, and other communication devices located all over the world, which are connected through many telephone systems and other means. Other examples of the communication network 108 include, without limitation, a standard Plain Old Telephone System (POTS), an Integrated Services Digital Network (ISDN), the Public Switched Telephone Network (PSTN), a cellular network, and any other type of packet-switched or circuit-switched network known in the art. In some embodiments, the communication network 108 may be administered by a Mobile Network Operator (MNO) whereas a casino entity may administer the gaming network 104.

It should be appreciated that the gaming network 104 and/or communication network 108 need not be limited to any one network type, and instead may be comprised of a number of different networks and/or network types. Moreover, the gaming network 104 and/or communication network 108 may comprise a number of different communication media such as coaxial cable, copper cable/wire, fiber-optic cable, antennas for transmitting/receiving wireless messages, wireless access points, routers, and combinations thereof.

In some embodiments, the gaming devices 112 may be distributed throughout a single property or premises (e.g., a single casino floor) or the gaming devices 112 may be distributed among a plurality of different properties. In a situation where the gaming devices 112 are distributed in a single property or premises, the gaming network 104 may include at least some wired connections between network nodes (e.g., a LAN or multiple LANs). As a non-limiting example, the nodes of the gaming network 104 may communicate with one another using any type of known or yet-to-be developed communication technology. Examples of such technologies include, without limitation, Ethernet, SCSI, PCIe, RS-232, RS-485, USB, ZigBee, WiFi, CDMA, GSM, HTTP, TCP/IP, UDP, etc.

The gaming devices 112 may utilize the same or different types of communication protocols to connect with the gaming network 104. It should also be appreciated that the gaming devices 112 may or may not present the same type of game to a player 124. It should be appreciated that a gaming device 112 may correspond to one example of a gaming device. It should also be appreciated that the functions and features described in connection with a gaming device 112 may be provided in any other type of gaming device without departing from the scope of the present disclosure.

In some embodiments, the gaming devices 112 may be configured to communicate with a centralized management server in the form of the central gaming server 116. The central gaming server 116 may be configured to centrally manage games of chance, games of skill, or hybrid games of chance/skill played at the gaming devices 112 (e.g., slot games), enable execution of a different game (e.g., a card game), monitor player 124 activity at the gaming devices 112, track player 124 association with a gaming device 112, facilitate communications with players 124 via the gaming devices 112, facilitate communications with players 124 via the personal gaming devices 120 (or other gaming devices), and/or perform any other task in connection with games played by a player 124 at gaming devices.

The escape room 150, as noted, has defined spatial boundaries, in real world, virtual reality, or mixed reality space and includes one or more gaming devices 112*a, b*, . . . . The escape room 150 can include physical, virtual, or mixed reality furnishings or other game pieces for the escape room game, such as door 154 comprising a lock 156, chair 158, bookcase 160, table 162, microphone 166, speakers 170, and picture, display, or window 174.

While specific furnishings and game pieces are shown in FIG. 1, it is to be understood that other types and numbers of furnishings and game pieces may be employed in the escape room game depending on the theme, puzzles, and game elements employed.

To monitor and track player and gaming activities in connection with determining individual player contributions to solving the escape room game, a selected puzzle in the game, or game element(s) in the game and other game events (e.g., a player action that solves a puzzle or game element), a plurality of digital or analog and passive or active context sensors 176*a, b*, . . . may be deployed throughout the escape room. The context sensors can be any device, module, machine, or subsystem that detects a player activity or other game event and sends the sensed information to the gaming device 112 or server 116. Examples of context sensors include chemical sensors that provide sensed information about a chemical composition of its environment, a biosensor or nanosensor that detects analytes derived from a biological component, a metal-oxide (MOS) or MOS-field-effect transistor (MOSFET) semiconductor sensor that measures physical, chemical, biological, or environmental parameters, image sensors, such as a charge-coupled device, that acquires a digital image of a selected object, and the like. The video camera 180 may be used not only to capture multimedia images of the players during gameplay for streaming to other gaming devices 112 or personal gaming devices 120 but also to collect multimedia information that may be processed to identify player contributions and other game events. The microphone 166 can capture speech of the various players 124, which, through speech recognition, converts the speech into a digital equivalent for processing by the gaming server 116. The personal gaming device 120 of the player, when registered with the gaming system, can also monitor and track player and gaming activities, either alone or in conjunction with a sensor 176, in connection with determining individual player contributions to solving the escape room game, a selected puzzle in the game, or game element(s) in the game and other game events.

In an example, the context sensor 176 and/or personal gaming device 120 of the player 124 can collect, as sensed information, a current spatial position or location or movement of the player 124 relative to a location grid or reference point in the escape room 150 at a selected point in time. The position can be relative to a coordinate system or selected object or location. The player can carry a signal emitter, such as a mobile device, to enable his or her location to be determined wirelessly. By way of illustration, the context sensor 176 can be part of a satellite positioning system (such as a Global Positioning system), a magnetic positioning device, an inertial measurement device, a Wi-Fi based positioning system (which measures the intensity of received wireless signals (or received signal strength)) and fingerprint location system (such as the use of SSID and MAC address of a nearby access point), Bluetooth location device, RFID tag, or other location device. Alternatively or additionally, the player location within the escape room 150 relative to a location grid or reference point can be determined using triangulation techniques.

In a further example of context, the context sensor 176 and/or personal gaming device 120 of the player can collect, as sensed information, displacement information associated with the player 124 relative to a location grid or reference point in the escape room 150. The displacement information, for instance, can be a fact or instance of spatial displacement of the player 124, a rate of displacement of the player 124, a distance of displacement of the player 124, and a direction of displacement of the player 124. The context sensor 176 can be, for instance, a motion sensor, such as a gyro sensor, accelerometer, magnetometer, or other motion detecting devices.

The context sensor 176 and/or personal gaming device 120 of the player can collect, as sensed information, information regarding an ambient condition in spatial proximity to a selected furnishing or other game piece. By way of illustration, the context sensor can collect information relating to ambient sound and light in spatial proximity to the selected furnishing or other game piece. The context sensor 176 can be, for instance, an audio or video recorder 180, a microphone 166 to detect sound, passive infrared detector, active ultrasonic wave-emitting detector, active ultrasonic detector, passive ultrasonic detector, microwave detector, or proximity detector to detect nearby persons, or a photoresistor, photovoltaic light sensor, light dependent sensor, or photo diode to detect light or light intensity, a thermocouple, thermistor, thermostat, or resistive temperature sensor to measure ambient temperature, a strain gauge, pressure switch, or load cell to measure player contact with a surface, a potentiometer, encoder, reflective/slotted opto-switch, or LVDT to determine position, a tacho-generator, reflective/slotted opto-coupler, or doppler effect sensor to measure speed, carbon microphone or piezo-electric crystal to measure sound, and the like.

The context sensor 176 can collect, as sensed information, physical parameters related to a player activity. Exemplary player activities include player contact with a surface or object, player speech (coupled with natural language processing to provide a text equivalent) and weight of an object. The context sensor 176 can be, for instance, a touch display, sensor, detector, or transducer that are electrical, opto-electrical, or electronic devices, respectively, composed of specialty electronics or otherwise sensitive materials, for determining if there is a presence of a particular entity or function.

Context sensors 176 in the form of stationary or movable cameras can be positioned to track objects, such as players 124 with the escape room 150, with or without fiducials.

In some embodiments, a player 124 may be enabled to enhance their experience with the gaming devices 112 via interactions with their personal gaming device 120. In some embodiments, the personal gaming device 120 may be considered a mobile device or another example of a gaming device 112. In some embodiments, the personal gaming device 120 is configured to be owned and carried by a player 124. For instance, a player 124 may be allowed to play a game at their personal gaming device 120 without ever having to physically engage a gaming device 112. The personal gaming device 120 may correspond to a mobile communication device, such as a smartphone, tablet, laptop, PDA, wearable device, an augmented reality headset, a virtual reality headset, or the like. In other embodiments, the personal gaming device 120 may correspond to a PC, gaming device, or the like that facilitates improved lottery game play for the player 124. Any of the above-mentioned examples of a personal gaming device 120 may correspond to an example of a gaming device as described herein.

In some embodiments, a personal gaming device 120 may be configured to communicate directly with a gaming device 112. In some embodiments, some or all of the game play may be achieved with the personal gaming device 120 rather than relying on the use of a gaming device 112. Where a personal gaming device 120 interacts with a gaming device 112, direct machine-to-machine communications may utilize a proximity-based communication protocol such as NFC, Bluetooth®, BLE, WiFi, or the like. Alternatively or additionally, the personal gaming devices 120 may be configured to communicate with other personal gaming devices 120 and/or the central gaming server 116 via the communication network 108. Such communications may be secured (e.g., encrypted) or unsecured depending upon the nature of information exchanged during the communications. A personal gaming device 120 may correspond to a player's 124 personal mobile device that uses an unsecured or untrusted communication network 108 or to a device issued to the player 124 during the player's visit at a particular casino, in which case the personal gaming device 120 may be administered with certain casino-approved security policies.

It should be appreciated that the central gaming server 116 may or may not be co-located with the gaming devices 112. Further still, players 124 may be allowed to carry multiple personal gaming devices 120, which may or may not be required to communicate or pair with a gaming device 112.

Figure 3:
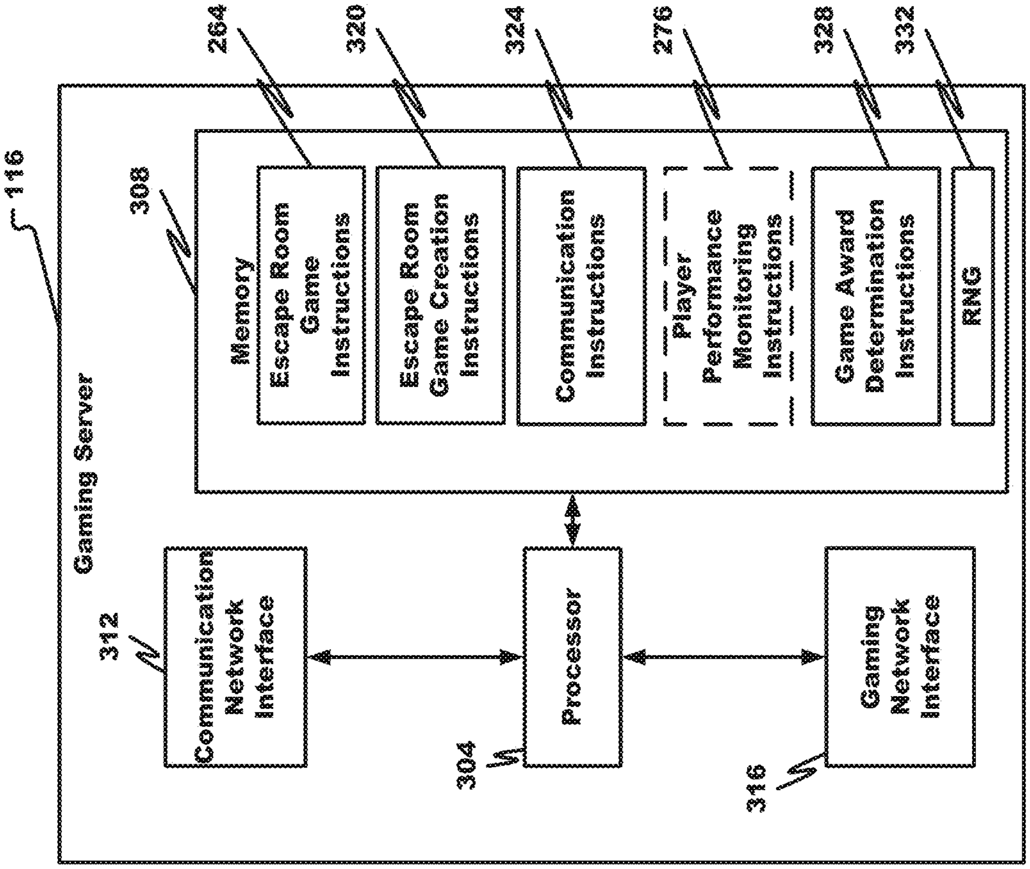
FIG. 3 depicts a gaming server configured providing an escape room game in accordance with embodiments of the present disclosure.

FIG. 1 also depicts the possibility of some personal gaming devices 120 being paired with a gaming device 112, thereby enabling communications to flow between the personal gaming device 120 and gaming device 112. This communication may utilize a proximity-based communication protocol, such as Bluetooth, BLE, NFC, WiFi, etc. FIG. 3 further shows that one or more personal gaming devices 120 of a third party 180 (not a player 124 in the escape room game) may not necessarily be paired with a gaming device 112, but such personal gaming devices 120 may still be configured to communicate with the central gaming server 116 via the communication network 108. Communications between the gaming device 112 and personal gaming device 120 may facilitate any number of combinations of gameplay opportunities.

The central gaming server 116 is in communication, via the gaming network 104, with player profile, escape room game, puzzle, and game element databases 184. The databases 184 may be configured to store one or multiple data structures that are used in connection gaming interactive activities of players 124 and the gaming system 100. The databases can use any database model and compatible database management system. Examples of database models include relational databases, object-oriented databases, and non-relational databases, such as NoSQL and NewSQL databases.

Figure 2:
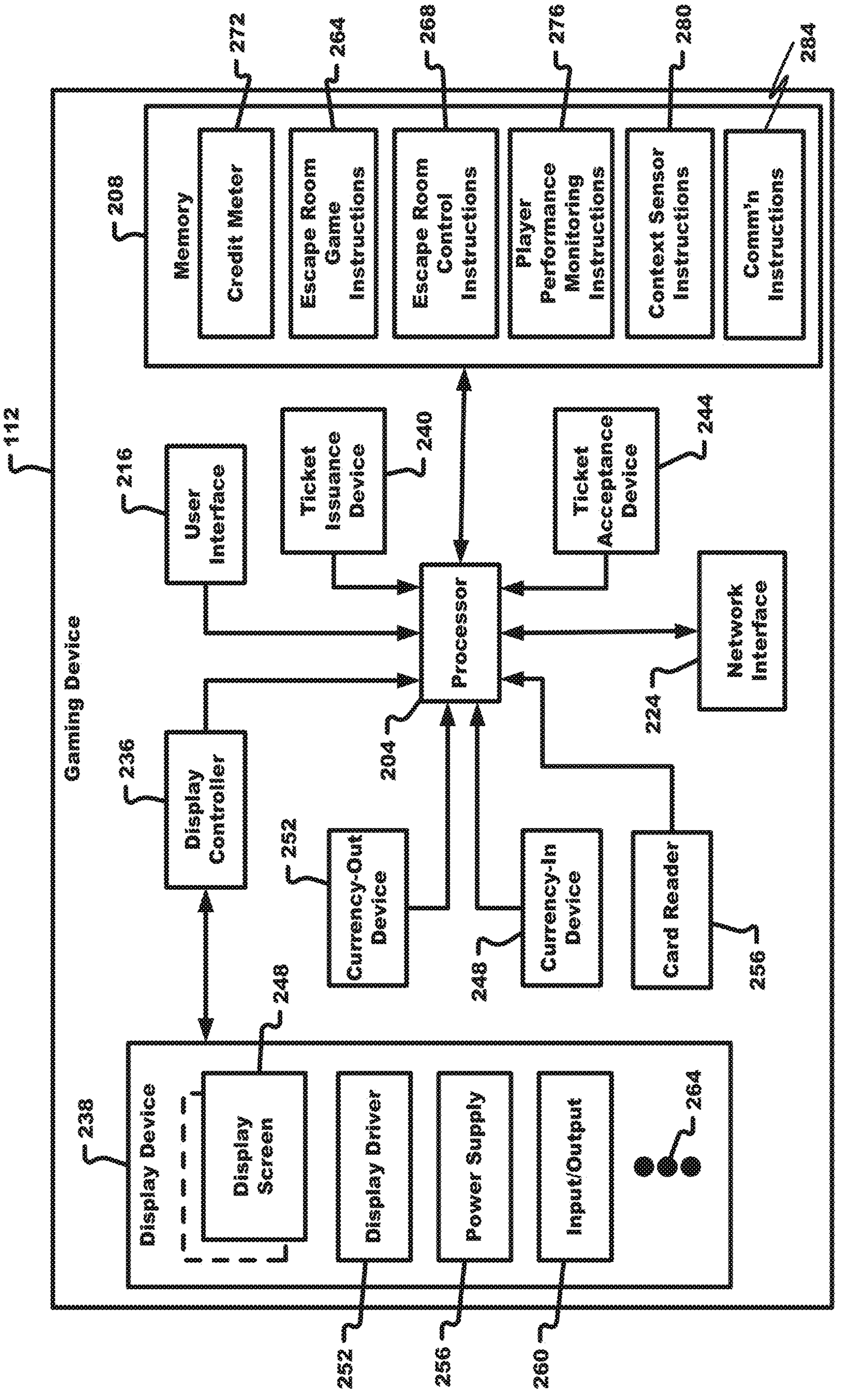
FIG. 2 depicts a gaming device configured for providing an escape room game in accordance with embodiments of the present disclosure.

With reference to FIG. 2, additional details of the components that may be included in a gaming device 112 or any other gaming device will be described in accordance with at least some embodiments of the present disclosure.

A gaming device 112 may correspond to a portable or non-portable device used for executing a gaming application or multiple different gaming applications without departing from the scope of the present disclosure. Non-limiting examples of a gaming device 112 include an EGM, a VGM, EGT, EGT player station, VR gaming machine, AR gaming machine, a mobile communication device (e.g., a smartphone, laptop, wearable device, etc.), a laptop, a PC, etc. The illustrative gaming device 112 depicted herein may include a support structure, housing or cabinet, which provides support for a plurality of displays, inputs, controls and other features of a conventional gaming machine. In some embodiments, a player 124 plays gaming device 112 while sitting, however, the gaming device 312 is alternatively configured so that a player can operate it while standing, moving, or sitting. The illustrated gaming device 112 can be positioned on the floor but can be positioned alternatively (i) on a base or stand, (ii) as a pub-style table-top game, (iii) as a stand-alone computational device on the floor of a casino with other stand-alone computational devices, or (iv) in any other suitable manner. The gaming device 112 can be constructed with varying cabinet and display configurations.

The gaming device 112 is shown to include a processor 204, memory 208, a network interface 224, and a user interface 216.

In some embodiments, the processor 204 may correspond to one or many microprocessors, CPUs, microcontrollers, Integrated Circuit (IC) chips, or the like. For instance, the processor 204 may be provided as silicon, as a Field Programmable Gate Array (FPGA), an Application-Specific Integrated Circuit (ASIC), any other type of Integrated Circuit (IC) chip, a collection of IC chips, or the like. As a more specific example, the processor 204 may be provided as a microcontroller, microprocessor, Central Processing Unit (CPU), or plurality of microprocessors that are configured to execute the instructions sets stored in memory 208. In some embodiments, the instruction sets stored in memory 208, when executed by the processor 204, may enable the gaming device 112 to provide game play functionality.

The nature of the network interface 224 may depend upon whether the network interface 224 is provided in cabinet- or player station-style gaming device 112 or a mobile gaming device 112. Examples of a suitable network interface 224 include, without limitation, an Ethernet port, a USB port, an RS-232 port, an RS-485 port, a NIC, an antenna, a driver circuit, a modulator/demodulator, etc. The network interface 224 may include one or multiple different network interfaces depending upon whether the gaming device 112 is connecting to a single gaming network 104 or multiple different types of gaming networks 104. For instance, the gaming device 112 may be provided with both a wired network interface 224 and a wireless network interface 224 without departing from the scope of the present disclosure.

The user interface 216 may include a combination of user input devices and user output devices. For instance, the user interface 216 may include a display screen, speakers, buttons, levers, a touch-sensitive display, or any other device that is capable of enabling player 124 interaction with the gaming device 112. The user interface 216 may also include one or more drivers for the various hardware components that enable player 124 interaction with the gaming device 112.

The memory 208 may include one or multiple computer memory devices that are volatile or non-volatile. The memory 208 may include volatile and/or non-volatile memory devices. Non-limiting examples of memory 208 include Random Access Memory (RAM), Read Only Memory (ROM), flash memory, Electronically-Erasable Programmable ROM (EEPROM), Dynamic RAM (DRAM), etc.

The memory 208 may be configured to store the instruction sets depicted in addition to temporarily storing data for the processor 204 to execute various types of routines or functions. The instruction sets can enable user interaction with the gaming device 112 and game play at the gaming device 112. Examples of instruction sets that may be stored in the memory 208 include a credit meter instruction set 272, an escape room game instruction set 264, escape room control instruction set 268, a player performance monitoring instruction set 276, context sensor instruction set 280, and communication instruction set 284. In addition to the instruction sets, the memory 208 may also be configured to store a random number generator (not shown) that is used by the escape room game instruction set 264, for example, to provide game outputs.

The credit meter instruction set 272 may correspond to a data structure within the gaming device 112 that facilitates a tracking of activity in the escape room game. In some embodiments, the credit meter instruction set 272 may be used to store or log information related to various player 124 activities and events that occur at the gaming device 112. The types of information that may be maintained in the credit meter instruction set 272 include, without limitation, player information, available credit information, wager amount information, and other types of information that may or may not need to be recorded for purposes of accounting for wagers placed at the gaming device 112 and payouts made or awards given for a player 124 during a game of chance or skill played at the gaming device 112. In some embodiments, the credit meter instruction set 272 may be configured to track coin-in activity, coin-out activity, coin-drop activity, jackpot paid activity, bonus paid activity, credits applied activity, external bonus payout activity, ticket/voucher in activity, ticket/voucher out activity, timing of events that occur at the gaming device 112, and the like. In some embodiments, certain portions of the credit meter instruction set 272 may be updated in response to outcomes of a game of chance or skill played at the gaming device 112 and/or in response to occurrences or outcomes of incidents associated with events the player 124 bet on at the gaming device 112 as part of a wagering session. In some embodiments, the credit meter instruction set 272 may be updated depending upon whether the gaming device 112 is issuing a ticket/voucher, being used as a point of redemption for a ticket/voucher, and/or any other activity associated with a ticket/voucher. Some or all of the data within the credit meter instruction set 272 may be reported to the gaming server 116, by way of non-limiting example, if such data applies to a centrally-managed game and/or a status of a ticket/voucher. As a non-limiting example, the number, value, and timing of wagers placed by a particular player 124 and payouts on such wagers may be reported to the gaming server 116.

In some embodiments, the escape room game instruction set 264, when executed by the processor 204, may enable the gaming device 116 to facilitate one or more escape room games with the player(s) 124. In some embodiments, the escape room game instruction set 264 may include subroutines that receive electronic messages from player(s) and others comprising an indication of consideration (e.g., a wager, mini wager, side wager, etc.) for occurrence of a predicted level of player performance in the escape room game, subroutines that stream a video of the escape room game to gaming and personal gaming devices 112, 120 of other non-players or third parties 180, subroutines that create, maintain and update player profiles of the player(s) to the escape room game, subroutines that generate, such as by a random number generator, input into the puzzles and game elements used in the escape room game, subroutines that present one or more escape room graphics to the player(s) 124 via the user interface 216 (e.g., displayed game information, a virtual reality display, or an augmented reality display), subroutines that, based on sensed information, monitor player activity and game events to determine whether or not a puzzle or game element has been solved by the player(s) 124 and/or an outcome of the escape room game, subroutines that, based on the monitored player activity and game events, offer the player(s) 124 with one or more hints to facilitate solving a puzzle or game element, subroutines that calculate whether an escape room wager has resulted in a win or loss during the escape room game, subroutines for determining payouts for the player(s) and others in the event of a win during the escape room game, subroutines for exchanging communications with another device, such as another gaming device 112 or gaming server 116, and any other subroutine useful in connection with facilitating escape room game play at the gaming device 112.

The escape room control instruction set 268, when executed by the processor 204, may enable the gaming device 116 to generate commands to control escape room furnishings and other game pieces in response to player input and input of the gaming server 116. For example, the escape room instruction set 268 can cause the generation of electrical signals to lock or unlock the electrochemical lock 156 in response to a state of the escape room game, cause a game piece, such as a combination lock, speakers 170, microphone 166, and picture, window, or display 174, to provide visual, auditory, haptic, somatosensory, or olfactory feedback to players, and perform other game activities to indicate occurrence of a predetermined game event, receipt of player input, provide a hint, and otherwise amplify and enhance player experience and indicate.

The player performance monitoring instruction set 276, when executed by the processor 204, determines, based on input from the context sensor instruction set 280, a relative contribution of each of the plurality of players to a game event (e.g., completing successfully each of the plurality of puzzles and/or game control components). The player performance monitoring instruction set 276, for example, can identify each game input of each player 124 and pair metadata comprising a description of the player input or other activity with a corresponding identity of the responsible player 124 and timestamp when the player activity was performed. The description can indicate whether or not the player activity contributed to solving a puzzle or game element.

The context sensor instruction set 280 may correspond to an instruction set within the gaming device 112 that, when executed by the processor 204, can convert sensed information into game input or other information and couple the game input or other information and an identity of the source sensor with a player activity and responsible player identity, timestamp, and/or game event. The context sensor instruction set 280 can include subroutines that convert analog sensor output into a digital equivalent and perform signal conditioning and calibration of sensor output for processing by the player performance monitoring instruction set 276. In some embodiments, the context sensor instruction set 280, when executed by the processor 604, may be used to store or log sensed information by sensor identity and sensor.

The communication instruction set 284, when executed by the processor 204, may enable the gaming device 112 to communicate with the central gaming server 116 and/or personal gaming device 120 or multiple personal gaming devices 120 and/or context sensors 176*a, b*, . . . In some embodiments, the communication instruction set 284 may include instructions that enable the gaming device 112 to pair with a personal gaming device 120 and establish a communication channel with the personal gaming device 120 via the pairing. As an example, the communication instruction set 284 may include instructions that enable NFC, Bluetooth®, Wi-Fi, or other types of communication protocols. It should be appreciated that the communication instruction set 284 may also be updated to reflect when a personal gaming device 120 is paired with the gaming device 112 and such pairing information may include addressing information for the personal gaming device 120 and/or identification information associated with the player 124 of the personal gaming device 120. Alternatively or additionally, the communication instruction set 284 may enable the gaming device 112 to identify a player 124 of the personal gaming device 120, identify a loyalty account associated with the player 124 of the personal gaming device 120, exchange information (e.g., send or receive) with a loyalty application operating on the personal gaming device 120, or combinations thereof. In some embodiments, the communication instruction set 284 may be configured to operate or drive the network interface 224 to facilitate direct or indirect communications with a personal gaming device 120 or context sensors 176*a, b*, . . . .

While shown as separate instruction sets, it should be appreciated that any of the credi5t meter 272, escape room control instructions 268, player performance monitoring instructions 276, context sensor instructions 280, and communication instructions 284 may correspond to a subroutine of the game instruction set 264 without departing from the scope of the present disclosure.

The gaming device 112 is further shown to include a ticket issuance device 240, a ticket acceptance device 244, a currency in device 248, a currency out device 252, and a card reader 256. The ticket issuance device 240 may be configured to print physical tickets, vouchers, or the like. The ticket acceptance device 244 may be configured to receive, scan, and/or recognize information from an input physical ticket, voucher, or cash. In some embodiments, the ticket issuance device 240 and ticket acceptance device 244 may operate in concert with a common piece of hardware that both accepts and produces physical tickets, vouchers, or the like. Tickets or vouchers printed by ticket issuance device 240 and recognizable by the ticket acceptance device 244 may correspond to physical lottery tickets, casino vouchers, paper coupons, and the like. Alternatively or additionally, the ticket issuance device 240 and/or ticket acceptance device 244 may be connected to ticket or cash reading hardware. In such an embodiment, the ticket issuance device 240 and ticket acceptance device 244 may operate as a driver and/or firmware component for the card reader.

Similarly, the currency in device 248 and currency out device 252 may include or operate in concert with a coin slot or any other type of coin delivery mechanism. The currency in device 248 and currency out device 252 may include hardware, drivers, or firmware that facilitate receiving or distributing tokens, coins, chips, etc. In some embodiments, the currency in device 248 may be configured to determine an amount of coins (an amount of tokens, an amount of chips, etc.), input at the coin slot and convert the values into credits for playing games with the escape room game instruction set 264. The currency out device 252 may correspond to hardware and software configured to output coins, tokens, chips, etc. if a player decides to cash out or convert playing credits back into coins, tokens, or chips, etc.

The card reader 256 may include hardware and/or software configured to read or accept any type of card, or portable credential (e.g., NFC, Bluetooth, Wi-Fi, etc.). In some embodiments, the card reader 256 may include hardware and/or software that enable contactless reading of a card, token, or portable credential. In some embodiments, the card reader 256 may include hardware and/or software that enable contact-based reading of a card, token, or portable credential (e.g., magstripe, chip reader, electrodes, card-receiving slot, etc.). It should be appreciated that the card reader 256 may be configured to receive and reader a card or portable credential, token, in any type of format (e.g., portable plastic card, magstripe card, key fob, etc.). It should also be appreciated that the card reader 256 may be configured to write information or data onto a card or portable credential. Furthermore, in some embodiments, the card reader 256 may be configured to read a player loyalty card in the form of a plastic credit-card shaped credential. In some embodiments, the card reader 256 may enable communications with a loyalty application operating on a player's personal gaming device 120.

The gaming device 112 may include one or more display devices 238 configured to render information, live video, communications windows, wagering interface windows, games, interactive elements, and/or other visual output to one or more display screens 248. The gaming device 112 may include one or more display controllers configured to control an operation of the display device 238. This operation may include the control of input (e.g., player input via the user interface 216, command input via the instruction sets in memory 208, combinations thereof, etc.), output (e.g., display, rendered images, visual game behavior, etc.) and/or other functions of the display device 238.

In an embodiment, the display device 238 comprises one or more display screens 248 that are configured to selectively activate pixels and/or display elements to render one or more games, windows, indicators, interactive elements, icons, characters, lights, images, etc. Non-limiting examples of the display screen 248 may include, but are in no way limited to, a liquid crystal display (LCD), a light-emitting diode (LED) display, an electroluminescent display (ELD), an organic LED (OLED) display, and/or some other two-dimensional and/or three-dimensional display. In some embodiments, the one or more display screens 248 may be separated into a main display and a secondary display.

In an embodiment, the display device 238 comprises one or more projectors to project virtual reality or augmented reality images during the escape room game. The projector(s) can be any projecting device that can project a computer image onto a projection augmented model (PA model) and/or a spatially augmented reality (SAR) model to provide the players 124 with augmented reality, augmented virtuality, and/or virtual reality computer-generated game environments. As will be appreciated, projection mapping, video mapping or SAR typically uses one or more optical devices or projectors that project a beam of light onto a selected escape room space to provide the player with the augmented reality, augmented virtuality, and/or virtual reality computer-generated game environments.

In an embodiment, the display device 238 comprises head-mounted displays worn by the players 124 to view the augmented reality, augmented virtuality, or virtual reality computer-generated game environments.

The display device 238 may include a display driver 252, a power supply 256, an input/output 260, and/or other components 264 configured to enable operation of the display device 238. The display driver 252 may receive commands and/or other data provided by the processor 204 and one or more of the instruction sets in memory 208. In response to receiving the commands, the display driver 252 may be configured to generate the driving signals necessary to render the appropriate images to the display screen 248. The power supply 256 may provide electric power to the components of the display device 238. In some embodiments, the power supply 256 may include a transformer and/or other electronics that prevent overloading, condition power signals, and/or provide backup power to the display device 238. The input/output 260 may correspond to one or more connections for receiving or exchanging information and/or video from components of the gaming device 112. The input/output 260 may include an interconnection to the network interface 216. By way of non-limiting example, the input/output 260 may include a high-definition multimedia interface (HDMI) input, Ethernet, composite video, component video, H.264, or other video connection.

With reference now to FIG. 3 additional details of a central gaming server 116 (hereinafter referred to as "gaming server") will be described in accordance with embodiments of the present disclosure. The gaming server 116 is shown to include a processor 304, memory 308, and a gaming network interface 316. These resources may enable functionality of the gaming server 116 as will be described herein. For instance, the gaming network interface 316 may provide the gaming server 116 with the ability to send and receive communication packets or the like over the gaming network 104. The gaming network interface 316 may be provided as a network interface card (NIC), a network port, drivers for the same, and the like. Communications between the components of the gaming server 116 and other devices connected to the gaming network 104 may all flow through the gaming network interface 316.

The gaming server 116 is also shown to include a communication network interface 312 that facilitates communications with the personal gaming devices 120 via the communication network 108. In some embodiments, the communication network interface 312 may be similar to the gaming network interface 312. For instance, the communication network interface 312 may also include a NIC, network port, drivers for the same, and the like. In some embodiments, the communication network and gaming network interfaces 312, 316 may be provided in a single physical component or set of components, but may correspond to different communication channels (e.g., software-defined channels, frequency-defined channels, amplitude-defined channels, etc.) that are used to send/receive different communications to the personal gaming devices 120 as compared to the gaming devices 112. In some embodiments, a single communication interface may facilitate communications with both the gaming devices 112 and personal gaming devices 120, especially if both devices communicate with the gaming server 116 via a common network.

The processor 304 may correspond to one or many computer processing devices. The processor 304 may be configured to execute one or more instruction sets stored in memory 308. Upon executing the instruction sets stored in memory 308, the processor 204 enables various authentication functions of the gaming server 116.

The memory 308 may include any type of computer memory device or collection of computer memory devices. The illustrative instruction sets that may be stored in memory 308 include, without limitation, the escape room game instruction set 264, escape room game creation instruction set 320, communication instruction set 324, optional player performance monitoring instruction set 276, game award determination instruction set 328, and random number generator 332 that is used by the escape room game instruction set 264, for example, to provide game outputs. Functions of the gaming server 116 enabled by these various instruction sets will be described in further detail herein. It should be appreciated that the instruction sets depicted in FIG. 3 may be combined (partially or completely) with other instruction sets or may be further separated into additional and different instruction sets, depending upon configuration preferences for the gaming server 116. Said another way, the particular instruction sets depicted in FIG. 3 should not be construed as limiting embodiments described herein.

Although not depicted, the gaming server 116 may include instructions that enable a processor to store data into the database(s) 184. Alternatively or additionally, the stored data may be stored internal to the gaming server 116 (e.g., within the memory 308 of the server 116 rather than in a separate database).

The operations of the escape room game instruction set 264 and player performance monitoring instruction set 276 have been discussed above with respect to FIG. 2.

The escape room game creation instruction set 320, when executed by the processor 304, may establish a predetermined period of time in which the player is required to solve the plurality of puzzles and select each of the plurality of puzzles from a set of puzzles. Each of the puzzles can include in the database(s) 184, a corresponding solution for puzzle completion, a credit amount associated with puzzle completion, a predetermined period of time for puzzle completion, and/or a difficulty level of the respective puzzle. The credit amount and predetermined period of time for puzzle completion are typically directly related to the difficulty level of the respective puzzle. In one embodiment, the escape room game creation instruction set 320 can cause the processor 304 to select a game element of a plurality of game elements, each of the game elements of the plurality of game elements comprising a set of inputs that determines a difficulty measure for the respective game element, and, based on a target difficulty level for a selected puzzle and a selected theme for the escape room game, assemble a plurality of game elements to form the selected puzzle.

The escape room game creation instruction set 320 can include a subroutine to merge selected fields in profiles of players in a group of players playing the escape room game to yield aggregate values used in determining escape room and/or puzzle difficulty level and/or a payout or credit amount for a winning outcome of the escape room game, a puzzle thereof, or a game element thereof. By way of illustration, the escape room game creation instruction set 320 can cause the processor 304 to determine an overall score for the plurality of players as a function of the overall score of each of the plurality of players. The difficulty level for example can be a direct function of an aggregate ranking or overall score of the players in the group of players.

The communication instruction set 324, when executed by the processor 304, may enable the gaming server 116 to communicate with the other devices in the system 100. For instance, the communication instruction set 324 may be configured to modulate/demodulate communications exchanged over the gaming network 104 and/or communication network 108, determine timings associated with such communications, determine addresses associated with such communications, etc. In some embodiments, the communication instruction set 324 may be configured to allocate communication ports of the gaming server 116 for use as either the communication network or gaming network interface 312, 316 as appropriate. The communication instruction set 324 may further be configured to generate messages in accordance with communication protocols used by the networks 104, 108 and to parse messages received via the networks 104, 108.

The game award determination instruction set 328, when executed by the processor 304, may determine an award based on the indication of consideration in the electronic message and an actual level of performance (or relative contribution) of the player in solving one or more of the plurality of puzzles and adjust a value in an electronic record associated with an account of the player to reflect the award. The award, or credit amount, is typically related to the difficulty level of the respective puzzle and/or an overall score or rank of one or more of the player(s) 124.

The random number generator ("RNG") 332 generates a distribution of numbers or game symbols that is not reasonably predictable by a random chance and that is used by the escape room game instruction set 264, for example, to provide game outputs. The random number generator output can be dynamically to alter game parameters. For example, a number of attempts that a player can use a game piece before it becomes unusable can be a function of the random number generator output. Random number generators can be truly random hardware random generators (HRNGS), which generate random numbers as a function of current value of some physical environment attribute that is constantly changing in a manner that is practically impossible to model, or pseudo-random number generators (PRNGS), which generate numbers that look random, but are actually deterministic, and can be reproduced if the state of the PRNG were known. In some applications, the random number generator 332 uses computational algorithms that can produce long sequences of apparently random results, which are in fact determined by a shorter initial value, known as a seed value or key.

In one embodiment, the random number generator 332 is a PRNG, which constantly generates a sequence of simulated random numbers, at a rate of hundreds or perhaps thousands per second. As soon as an input for game is requested from a player, the gaming device, or the gaming server, the most recent random number is used to determine the result. This means that the result varies depending on exactly when the game is played.

Figure 4:
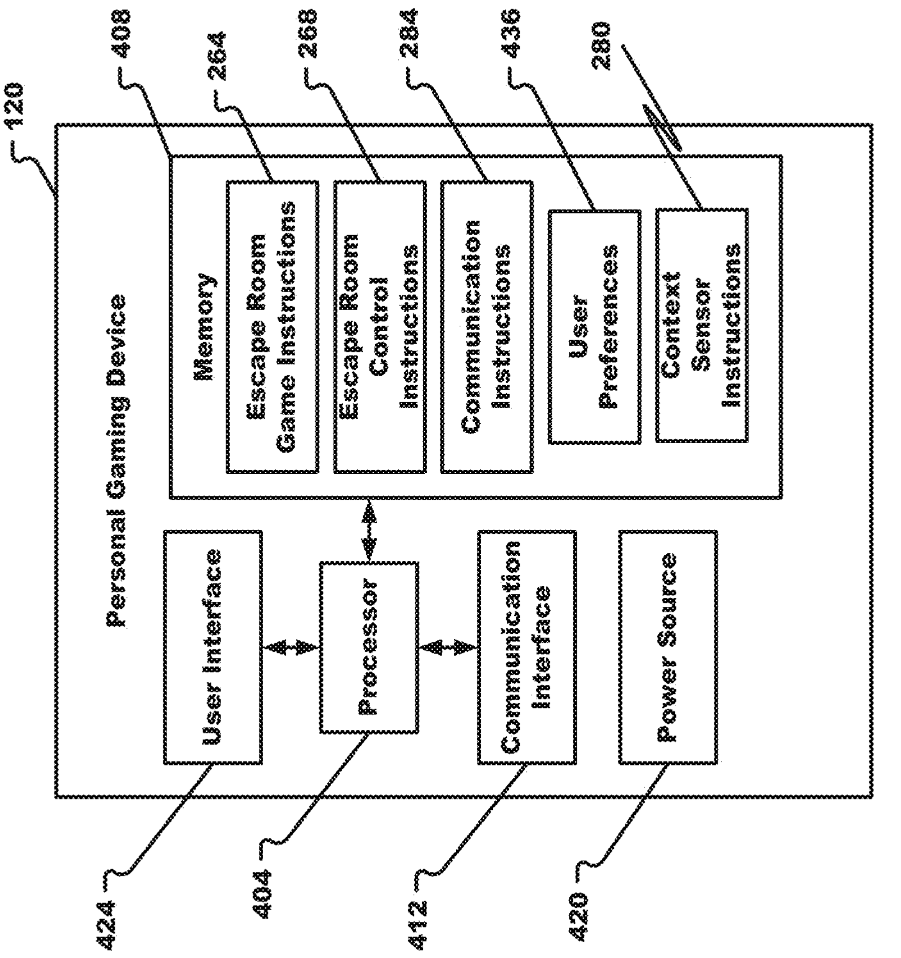
FIG. 4 depicts a personal gaming device configured for use with an escape room game in accordance with embodiments of the present disclosure.

With reference now to FIG. 4, additional details of the components that may be included in a personal gaming device 120 will be described in accordance with at least some embodiments of the present disclosure. The personal gaming device 120 is shown to include a processor 404, memory 408, a communication interface 412, power source 420, and a user interface 424. The processor 404 may be configured to execute one or more instruction sets stored in memory 408. In some embodiments, the instruction sets stored in memory 408, when executed by the processor 404, may enable the personal gaming device 120 to provide game play functionality, interact with gaming devices 112, pair with gaming devices 112, or any other type of desired functionality.

While shown as separate instruction sets, it should be appreciated that any of the escape room creation instructions 320, communication instructions 324, player performance monitoring instructions 276, and/or game award determination instructions 328 may correspond to a subroutine of the game instruction set 264 without departing from the scope of the present disclosure.

The communication interface 412 may be similar or identical to the network interface 224 and/or communication network and/or gaming network interfaces 312, 316 depicted and described herein. The nature of the communication interface 412 may depend upon the type of communication network 108 for which the personal gaming device 120 is configured. Examples of a suitable communication interfaces 412 include, without limitation, a Wi-Fi antenna and driver circuit, a Bluetooth antenna and driver circuit, a cellular communication antenna and driver circuit, a modulator/demodulator, etc. The communication interface 412 may include one or multiple different network interfaces depending upon whether the personal gaming device 120 is connecting to a single communication network 108 or multiple different types of communication networks. For instance, the personal gaming device 120 may be provided with both a wired communication interface 412 and a wireless communication interface 412 without departing from the scope of the present disclosure.

The user interface 424 may include a combination of user input and user output devices. For instance, the user interface 424 may include a display device, a microphone, a speaker, a haptic feedback device, a light, a touch-sensitive display, a button, or a combination thereof. The user interface 424 may also include one or more drivers for the various hardware components that enable user interaction with the personal gaming device 120.

The memory 408 may be configured to store instruction sets that enable user interaction with the personal gaming device 120 and that enable game play at the personal gaming device 120. Examples of instruction sets that may be stored in the memory 408 include an escape game instruction set 264, escape room control instruction set 268, communication instruction set 284, and context sensor instruction set 280. In addition to the instruction sets, the memory 408 may also be configured to store data that is useable by the various instruction sets. Examples of such data that may be stored in memory 408 include, without limitation user preferences 436.

The operations of the escape game instruction set 264, escape room control instruction set 268, and context sensor instruction set 280 have been discussed above with respect to FIGS. 2-3.

The communication instruction set 432, when executed by the processor 404, may enable the personal gaming device 120 to communicate via the communication network 108. In some embodiments, the communication instruction set 432 may be similar or identical to the communication instruction sets 284, 324 and may be particular to the type of communication network 108 used by the personal gaming device 120. As an example, the communication instruction set 432 may be configured to enable cellular, Wi-Fi, and/or Bluetooth communications with other devices. The communication instruction set 432 may follow predefined communication protocols and, in some embodiments, may enable the personal gaming device 120 to remain paired with a gaming device 112 as long as the personal gaming device 120 is within a predetermined proximity (e.g., 20-30 feet, an NFC communication range, or a Bluetooth communication range) and paired with the gaming device 112.

The user preferences 436 may correspond to gaming or wager preferences that are desired by the player 124 of the personal gaming device 120. In some embodiments, where the personal gaming device 120 is not owned by the player 124, but rather is loaned to the player 124 by a casino operator, the user preferences 436 may include default preferences defined by the casino as well as other preferences that are defined by the player 124 after receiving the personal gaming device 120. The user preferences 436 may alternatively or additionally relate to communication preferences that drive operation of the communication instruction set 432. In some embodiments, the user preferences 436 may include user preferences controlling the game pieces and other parameters of the escape room game and may enable automated selection or assignment of the escape room game parameters. The gaming device 112, context sensors 176, and personal gaming device 120 may be configured to communicate with one another during an escape room game play session.

By way of illustration, player 124 can, by user preferences 436, select automatically certain visual, auditory, haptic, somatosensory, and olfactory feedback from game pieces of the escape room game. For instance, a player having a disability may desire a certain type of feedback to enhance his or her gaming experience.

While shown as separate instruction sets, it should be appreciated that any of the escape room control instructions 268, communication instructions 284, and context sensor instructions 280 may correspond to a subroutine of the game instruction set 264 without departing from the scope of the present disclosure.

Referring now to FIGS. 5A, 5B, 5C, and 5D, the data structures in the player profile, escape room game, puzzle, and game element databases 184*a-d* will be discussed.

Figure 5A:
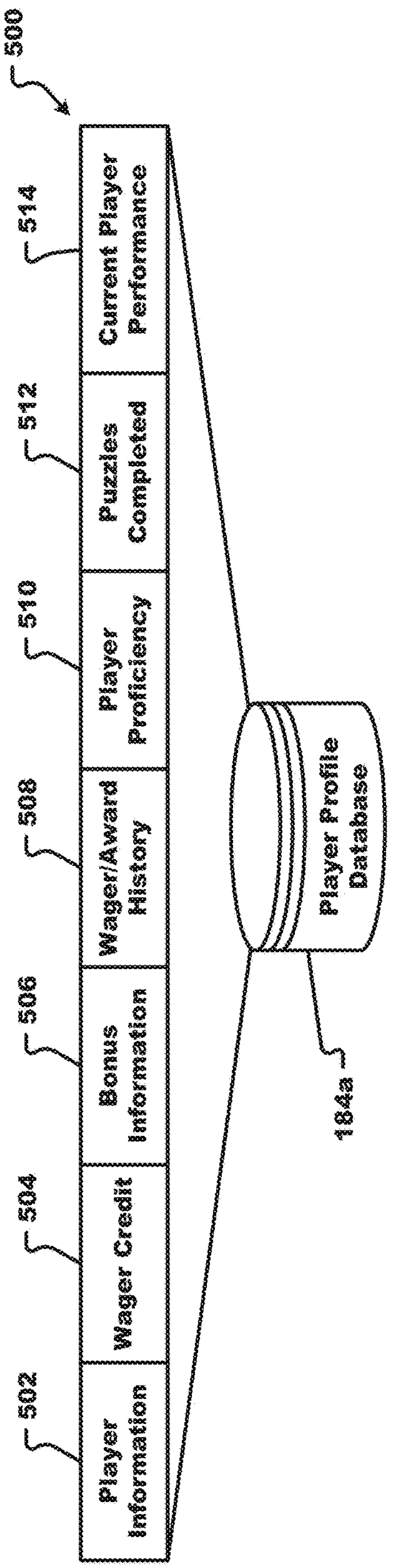
FIG. 5A illustrates data structures in a player profile database configured for use with an escape room game in accordance with embodiments of the present disclosure.

With reference to FIG. 5A, the data stored in the player profile database 184*a* may be stored for a plurality of different player profiles or for a single player profile. The player profile data structures 500 may include a player information field 502, wager credit field 504, bonus information field 506, wager/award history field 508, player proficiency or ranking field 510, puzzles completed field 512, and current player performance field 514.

The player information field 502 may be used to store any type of information that identifies a player. In some embodiments, the player information field 502 may store one or more of username information for a player 124, contact information for the player (such as email address, phone number, social website webpage universal resource locator, and the like), password information for a player account, player status information, accommodations associated with the player 124, and any other type of customer service management data that may be stored with respect to a player 124.

The wager credit field 504 may be used to store data about a player's 124 available credit with a casino or a plurality of casinos. For instance, the wager credit field 504 may store an electronic record of available credit in the player's account and whether any restrictions are associated with such credit. The wager credit field 504 may further store information describing a player's available credit over time, wagers made over time, cash out events for the player, winning events for the player, and the like.

The bonus information field 506 may be used to store information describing awards that have been paid to the player 124 or that are available to be paid in response to particular events occurring within the gaming system. As a non-limiting example, the award information field 506 may be used to store electronic records for values of awards that are available to or have been paid to the player 124.

The wager/award history field 508 may store data related to awards, bonuses, mini bonuses, jackpots, side bets, etc. granted to the player 124. The wager/award history field 508 may also indicate when such awards were granted to the player 124, whether the awards have been redeemed, whether the awards are being funded by a game of chance or skill, a mini bonus associated with an event, or a side bet award.

The player proficiency field 510 may store data related to a player's skill level, ranking, score, or other proficiency metric in connection with escape room play, or solving puzzles or game elements of escape room games. The player proficiency field 510 value is based on historic escape room games in which the player participated. When the player participated in the escape room games as a member of a team, the field value can be based in part on the relative contributions the player made towards solving within the allotted predetermined time the various puzzles in the game and in part on the overall performance of the team.

The puzzles completed field 512 may store data related to the puzzles completed by the player either individually or as part of a team. The field may include not only a link to or other identifier of the puzzle but also a difficulty level or configuration (e.g., theme) of the puzzle.

The current player performance field 514 may store data related to a performance of the player in a current escape room game. The field 514 may contain metadata describing, for each puzzle or game element completed, one or more of an identity of the escape room game (such as a link to the escape room game data structures), a time to complete the selected puzzle or game element, a time required to complete the selected puzzle or game element, a number of attempts by the players of the escape room game to solve the selected puzzle or game element, a difficulty level of the selected puzzle or game element, the identities of the other players on the group of players in the escape room game (e.g., a link to the profiles of each of the other players), the activities of the corresponding player in the escape room game, and a relative contribution of the corresponding player to solving each puzzle or game element.

Figure 5B:
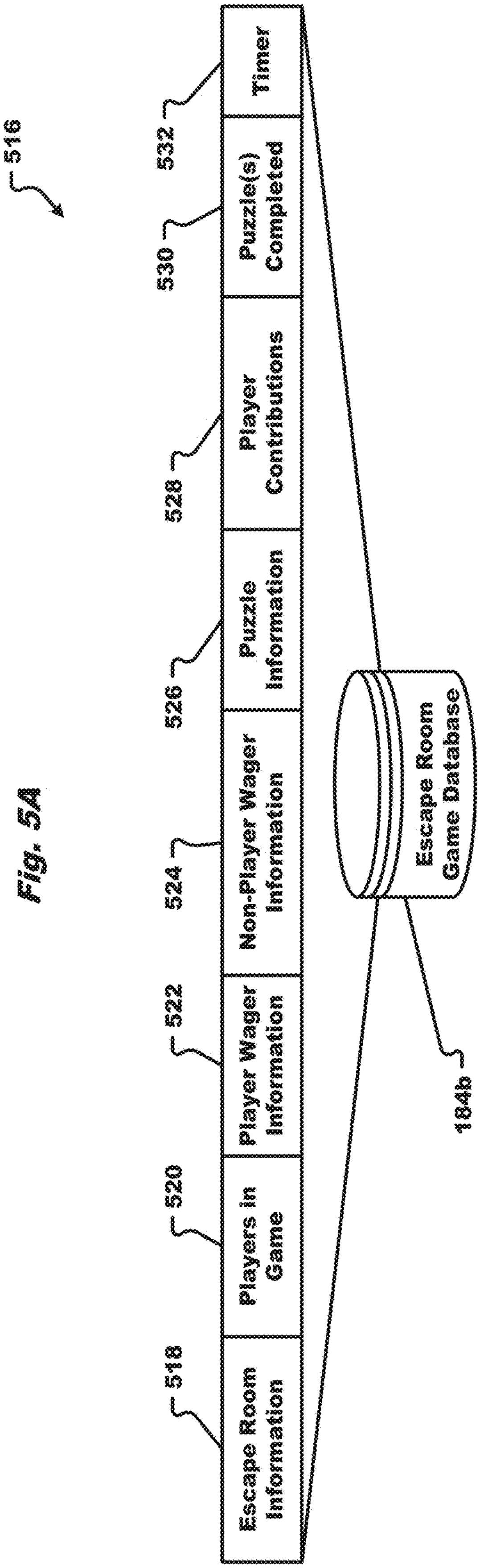
FIG. 5B illustrates data structures in an escape room game database configured for use with an escape room game in accordance with embodiments of the present disclosure.

With reference to FIG. 5B, the data stored in the escape room database 184*b* for a plurality of different escape room games or for a single escape room game. The data structures 516 may include a plurality of data fields that include, for instance, an escape room information field 518, players in the associated escape room game field 520, player wager information field 522, non-player wager information field 524, puzzle information field 526, player contributions field 528, puzzle(s) completed field 530, and timer field 532.

The escape room information field 518 may be used to store any type of information that describes an escape room configuration in connection with a corresponding escape room game. The escape room information field 518 can include an identification of not only the escape room games using the respective escape room but also the gaming device(s) 112 and personal gaming devices 120 in the escape room 150 (e.g., by identifying the MAC address or the IP address of the gaming device(s)), a description of the escape room 150 configuration (e.g., theme of escape room, furnishings and other game items in the escape room, etc.), difficulty level of the escape room, and the like).

The players in the escape room game field 520 may be used to store one or more identifiers regarding the players in the group of players in the corresponding escape room game. The field 520 may include links to the player profiles of each of the players in the group.

The player and non-player wager information fields 522, 524 may be used to store the wagers of each player or non-player, respectively, with respect to an event outcome of the escape room game. The event outcome, for instance, can be occurrence of a respective predicted level of performance of one or more of the players in the escape room game.

The puzzle information field 526 may be used to store identities of puzzles and/or game elements or configuration (e.g., theme) of the puzzles and/or game elements used in the corresponding escape room game. This can be done by links to the data structures corresponding to each of the puzzles and/or other game elements.

The player contributions field 528 may be used to store the contributions of each player on the team to solving a respective one of the puzzles and/or game elements in the associated escape room game. This can be done by including links to the current player performance field 514 of the player profile of each player or vice versa.

The puzzle(s) completed field 530 may be used to store identities of the puzzles and/or game elements completed timely in the associated escape room game. This can be done, for instance, by links to the data structures corresponding to each of the puzzles and/or other game elements.

The timer field 532 may be used to store the maximum and current timer values in the corresponding escape room game.

Figure 5C:
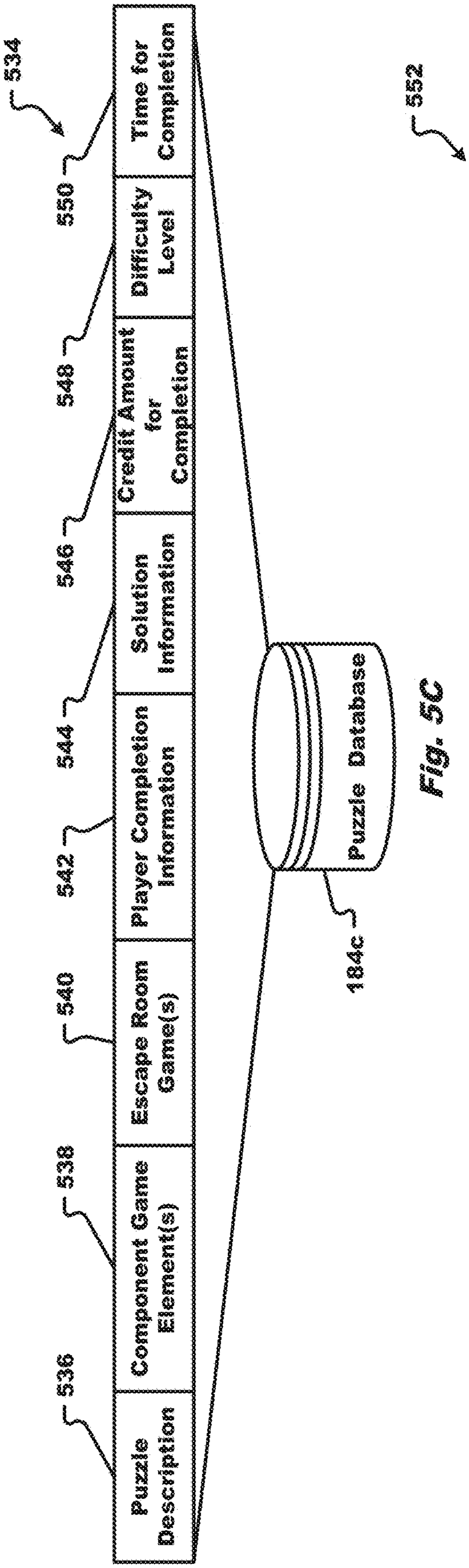
FIG. 5C illustrates data structures in a puzzle database configured for use with an escape room game in accordance with embodiments of the present disclosure.

With reference to FIG. 5C, the data stored in the puzzle database 184*c* may be stored for a plurality of different puzzles or for a single puzzle. The puzzle data structures 534 may include a puzzle description field 536, component game element(s) field 538, escape room game(s) field 540, player completion information field 542, solution information field 544, credit amount for completion field 546, difficulty level field 548, and time for completion field 550.

The puzzle description field 536 may be used to store any type of information that identifies and describes the corresponding puzzle. In some embodiments, the puzzle description field 536 may store one or more of puzzle name information for the puzzle, puzzle type, puzzle difficulty level, themes compatible with the puzzle, other puzzles compatible with the respective puzzle (e.g., by incorporating links to the puzzle data structures 534 of the other puzzles), and escape room configurations compatible with the puzzle (e.g., by incorporating links to the escape room data structures 516).

The component game element(s) field 538 may be used to store data about the component game element(s) that are compatible with the puzzle. In one configuration, the data comprises links to the corresponding game element data structures 552.

The escape room game(s) field 540 may be used to store information describing the escape room games in which the respective puzzle has been used. In one configuration, the data comprises links to the corresponding escape room information field 518.

The player completion information field 542 may store data related to the players who have completed the puzzle either successfully or unsuccessfully and other proficiency metrics (e.g., for each player or group of players, how many attempts and how much time were required for the successful or unsuccessful outcome, etc.). In one configuration, the data comprises links to the corresponding player profiles of the players. This information can be used during escape room game creation to remove puzzles from consideration in creating an escape room game that have been played previously by one or more of the players in the current escape room game. Alternatively, the fact that one or more of the players has previously played the puzzle can be used to increase or decrease a difficulty level of the puzzle and/or reduce or increase the potential payout to the players from the escape room game (e.g., change the winning odds in favor of the casino or player, respectively). In some embodiments, the historical information in the player completion information field 542 is used to balance the respective puzzle by ranking or updating its difficulty level based on the proficiency levels and gameplay information of the players referenced in the player completion information field 542 and generating a good credit amount to be given to the successful completion of the puzzle. The historical information can measure the success rate of players for the puzzle and its component game elements and therefore determine more realistically a level of difficulty for the puzzle and its component game elements. This ability can be particularly important when the game system modifies escape room games, puzzles and/or game elements in new ways.

The solution information field 544 may store data related to one or more solutions of the respective puzzle. The solution(s) may be described as a sequence of gaming events required for the puzzle to be solved.

The credit amount for completion field 546 may store data related to the credit amount(s) or awards offered for successful solution of the puzzle.

The difficulty level field 548 may store data related to one or more difficulty levels of the respective puzzle. The field can include a description of different puzzle configurations to produce differing difficulty levels.

The time for completion field 550 may store data related to a maximum time required to solve the puzzle successfully.

Figure 5D:
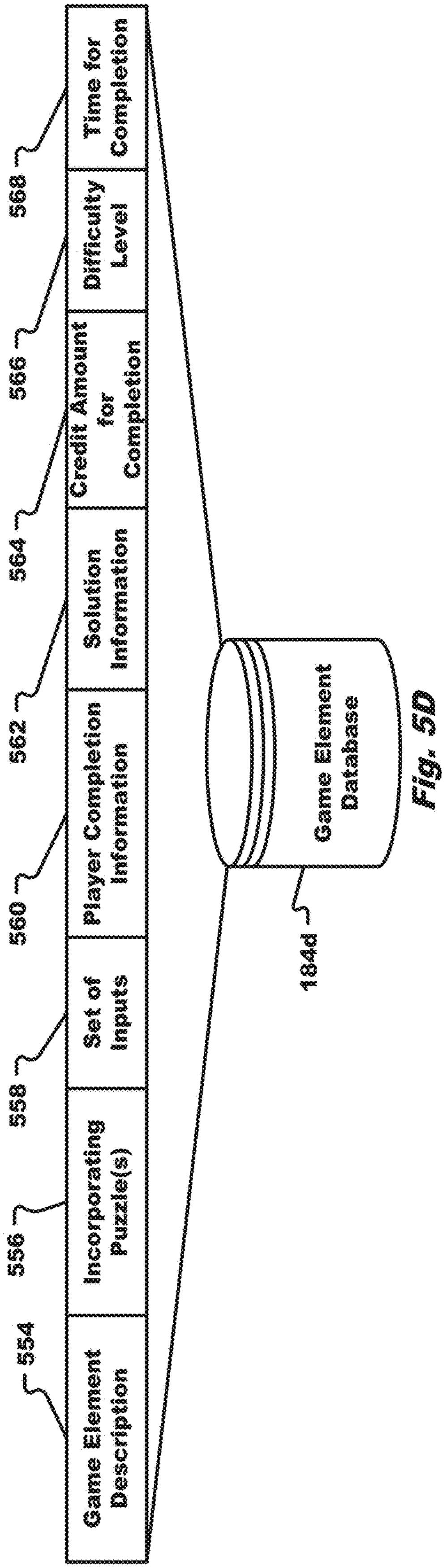
FIG. 5D illustrates data structures in a game element database configured for use with an escape room game in accordance with embodiments of the present disclosure.

With reference to FIG. 5D, the data stored in the game element database 184*d* may be stored for a plurality of different game elements used in the puzzles and escape room games. The game elements can take many configurations. The game elements can, for example, be in the form of a tumbler locking/unlocking mechanism having a predetermined number of combinations to choose from, a hidden button game element in which a button is hidden behind an object selected from a group of objects (e.g., a book, a desk, a chair, etc.), a knowledge-based game element such as a clue that can be selected from a set of possible clues, and the like. The game elements can be assembled in a predetermined sequence to form a puzzle, with the puzzle acting as a type of template for how to assemble the game elements for a specific them-based escape room.

The data structures 552 may include a plurality of data fields that include, for instance, a game element description field 554, incorporating puzzle(s) field 556, a set of inputs field 558, a player completion information field 560, a solution information field 562, a credit amount for completion field 564, a difficulty level field 566, and a time for completion field 568.

The game element description field 554 may be used to store any type of information that describes the respective game element. The game element description field 554 can include an identification of the corresponding game element, a type of the corresponding game element, and other metadata describing the game element.

The incorporating puzzle(s) field 556 may be used to store puzzle that are compatible with the corresponding game element. In one configuration, the data comprises links to the corresponding puzzle data structures 534.

The set of inputs field 558 may be used to store information regarding the number, types and source of inputs to the corresponding game element. The inputs determine a characteristic of the game element, such as a difficulty level of the game element, a number of tries to operate the game element, a number of choices that the user to operate the game element and the like. Exemplary inputs include a player or operator requested difficulty level for the escape room game or component puzzle, a proficiency level of one or more players to the escape room game, a player requested theme for the escape room game, and the puzzle to be employed.

The player completion information field 560 may be used to store the players who have completed the corresponding game element either successfully or unsuccessfully and other proficiency metrics (e.g., for each player or group of players, how many attempts and how much time were required for the successful or unsuccessful outcome). In one configuration, the data comprises links to the corresponding player profiles of the players. This information can be used during escape room game creation to remove game elements from consideration in creating an escape room game that have been played previously by one or more of the players in the current escape room game. Alternatively, the fact that one or more of the players has previously played the game element can be used to increase a difficulty level of the game element or puzzle and/or reduce the potential payout to the players from the escape room game (e.g., change the winning odds in favor of the casino).

The solution information field 562 may be used to store one or more solutions that may be employed for the game element.

The credit amount for completion field 564 may store data related to the credit amount(s) or award(s) offered for successful solution of the corresponding game element.

The difficulty level field 566 may store data related to one or more difficulty levels of the respective game element. The field can include a description of different game element configurations to produce differing difficulty levels.

The time for completion field 568 may store data related to a maximum time required to solve the game element successfully.

Figure 6:
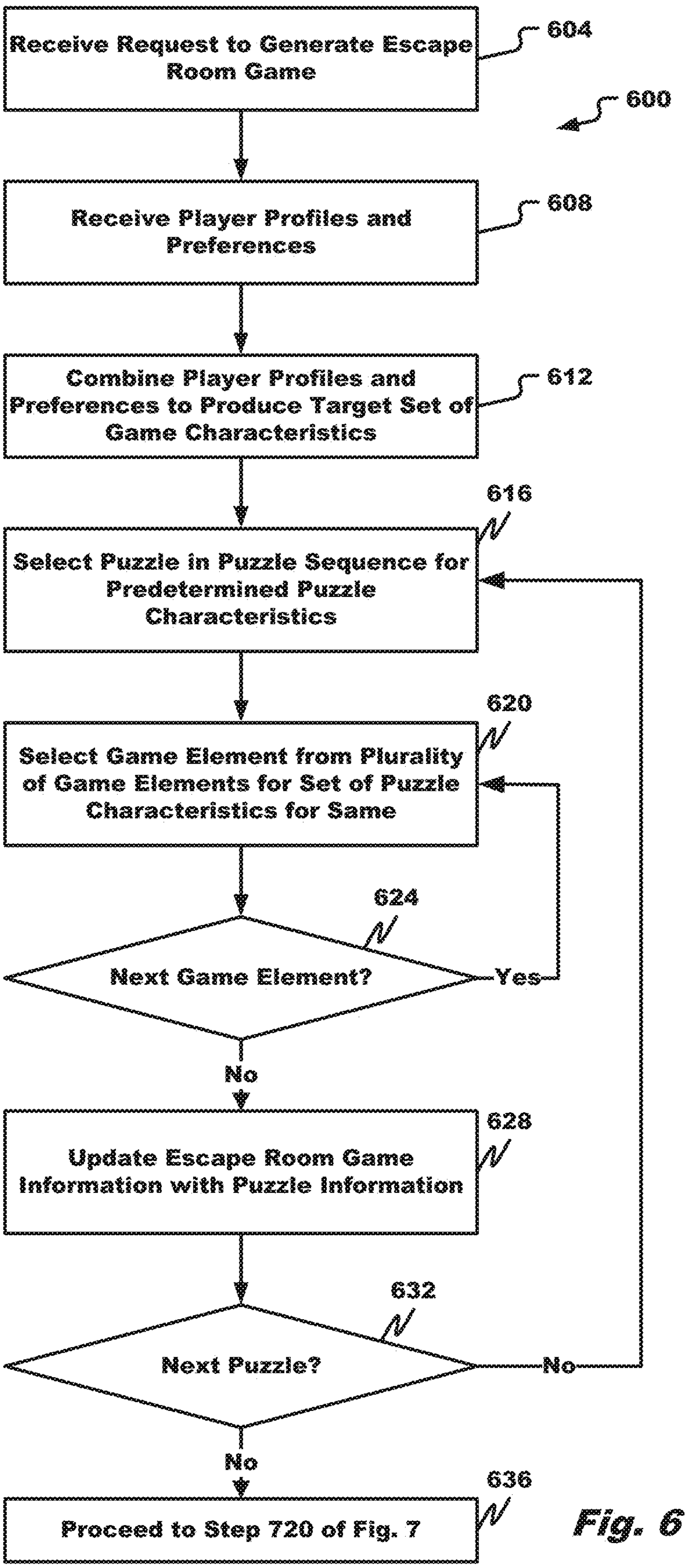
FIG. 6 is a flow chart illustrating an escape room game creation logic in accordance with embodiments of the present disclosure.
Figure 7:
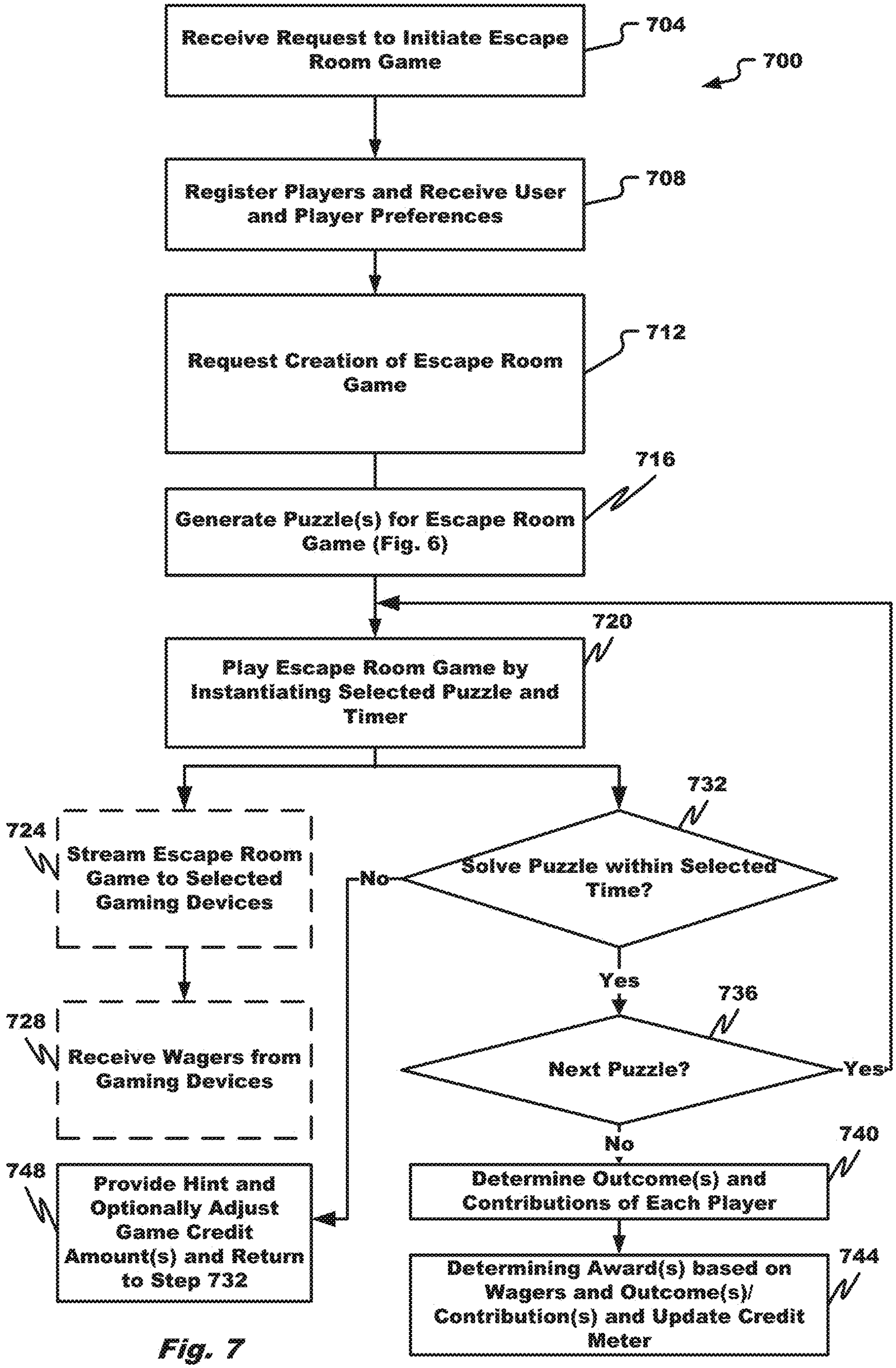
FIG. 7 is a flow chart illustrating an escape room game logic in accordance with embodiments of the present disclosure.

With reference now to FIGS. 6 and 7, various operations of the gaming system 100 will be described in accordance with at least some embodiments of the present disclosure.

With reference to FIG. 7, the method 700 begins when the gaming device 112 or central gaming server 116 receives a request to initiate an escape room game (step 704). The request can be by player input received by the user interface 216 of the gaming device 112 or user interface 424 of the personal gaming device 120 or from a gaming device 112 in response to play of a base game played on the same or another gaming device 112.

The method may continue by registering the players for the escape room game and receiving user and player preferences (step 708). In some embodiments, each user or player creates a new account on a kiosk (not shown) or the gaming device 112 in communication with the gaming server 116 using a username and a Quick Response ("QR") code for a code for the user to scan to download a mobile application. Once the application is installed on his or her personal gaming device, he or she will be presented with an option to register and save the personal gaming device on his or her account. The kiosk or gaming device 112 would then show a QR code to scan or a code he or she can type into the personal gaming device to pair up with the kiosk or gaming device 112. The kiosk will save the MAC Address of the personal gaming device and any other needed information to pair up with the personal gaming device. Data can be transmitted using encryption with a public/private key exchange, with the user's private key being stored on his or her account.

If the user has an existing account, the account can track his or her records and progress. The kiosk or gaming device display would render a QR code which could be scanned by an application on his or her personal gaming device, which would connect the personal gaming device to the kiosk using either Bluetooth, wireless, 5G or any other method of two-way transmitting data. Another option would be to use a random letter and number code which the user types into their mobile phone application to pair the kiosk with the personal gaming phone.

As part of the registration process, the gaming server can obtain player game preferences for the escape room game. The player game preferences, in some embodiments, for the escape room game comprise a set of escape room game characteristics (e.g., difficulty level, theme, time duration for game completion, payout desired, etc.) requested by the players for the next escape room game. The user preferences 436 are obtained by a request to the paired personal gaming device 120 of each player.

The gaming device 112 or a personal gaming device 120 then requests the game server 116 to create an escape room game (step 712) and the game server 116 proceeds with creating an escape room game (step 716).

FIG. 6 shows an embodiment of the process used by the game server 116 to create an escape room game.

The method 600 starts the game creation process in response to receiving the request to generate the escape room game (step 604).

The method 600 may continue by the gaming server 116 receiving the player profiles, player game preferences, and user preferences from the player profile database **184*a* and/or from the personal gaming device 120 and/or from the gaming device 112 (step 608**).

The gaming server 116 first determines from the request received in step 604 the identities of the players in the group of players desiring to play cooperatively an escape room game. The player game preferences, in some embodiments, comprise a set of escape room game characteristics (e.g., difficulty level, theme, time duration for game completion, payout desired, etc.) requested by the players for a next escape room game.

The method 600 can continue by the gaming server 116 combining selected fields of the player profiles and user preferences to produce a target set of game characteristics (step 612). The target set of game characteristics can include a number of game parameters, including without limitation difficulty level, theme or concept, time duration to complete the game, a number of hints requirements, wager requirements, payout or credit amount desired, and other game characteristics. In one embodiment, the target set of game characteristics represents a hypothetical player having a set of player characteristics derived from the selected fields of the player profile and user preferences of each of the players. While any technique for combining the selected fields can be employed, common techniques include deriving a mean, average, or mode of the value distribution of each selected characteristic in all of the player profiles or selecting as the field value a highest value for the selected characteristic amongst all of the fields for the selected characteristic in the player profiles.

The method 600 can continue by the gaming server 116 selecting, from among a plurality or pool of puzzles and based on the target set of game characteristics, a first puzzle in a puzzle sequence for the escape room game (step 616). In some embodiments, the escape room game matching the target set of game characteristics is configured as a master template defining a hierarchical structure of puzzles and, for each puzzle, a set of puzzle characteristics for the escape room game. In some embodiments, the escape room game is simply a collection of puzzles, with each puzzle having a corresponding set of puzzle characteristics matching the target set of game characteristics.

The method 600 can continue by the gaming server 116 selecting, from among a plurality or pool of game elements and based on the target set of puzzle characteristics, a game element matching the set of puzzle characteristics (step 620). As noted, each puzzle can be configured as a puzzle template or set of specifications defining the sequential order and desired characteristics for a plurality of game elements to be assembled to yield an escape room game-ready puzzle. The gaming server 116 updates the puzzle data structures 534 and game element data structures 552 in the puzzle and game element databases 184*c*-*d*, respectively.

The method 600 can continue by the gaming server 116 determining whether the puzzle requires selection of a next game element (decision diamond 624).

When a next game element is required to be selected to complete the puzzle, the gaming server 116 returns to and repeats step 620.

When a next game element is not required to be selected to complete the puzzle, the gaming server 116 updates the escape room game data structures 516 in the escape room game database 184*b* (step 628).

The method 600 can continue by the gaming server 116 determining whether the target set of game characteristics requires a next puzzle to be selected (decision diamond 632).

When a next puzzle is required to be selected to complete the escape room game, the gaming server 116 returns to and repeats step 616.

When a next puzzle is not required to be selected to complete the escape room game, the gaming server 116 proceeds to step 720 of FIG. 7 (step 636).

Returning to FIG. 7, the method 700 continues by the gaming server 116 or gaming device 112 initiating or continuing play (as the case may be) of the escape room game by instantiating a selected puzzle from step 716 and a game timer (step 720).

In some embodiments, the gaming device 112 or gaming server 116 can stream video of the escape room game to selected gaming devices 112 of other non-players (step 724) and receive wagers from the gaming devices of the non-players in response to the streamed video (step 728).

Returning to step 720, the method 700 continues by the gaming server 116 or gaming device 112 determining whether the players have solved the selected puzzle within a selected time (decision diamond 732).

When the players have not solved the selected puzzle within the selected time, the gaming server 116 or gaming device 112 offers the players an option to receive a hint and the terms of the hint. Terms can include, for example, use of a stipulated number of game credits, placement of a further wager or increasing a wager to a certain minimum amount, agreement to a reduced award or less favorable winning odds, and/or pay with some other item of value.

When the players comply with the option terms, the gaming server 116 or gaming device 112 provides the hint to the players (step 748).

When the players have solved the selected puzzle within the selected time, the gaming server 116 or gaming device 112 determines whether there is a next puzzle in the escape room game to be solved (decision diamond 736).

When there is a next puzzle to be solved, the gaming server 116 or gaming device 112 returns to and repeats step 720.

When the players have solved the final puzzle in the escape room game, the gaming server 116 or gaming device 112 determines one or more outcomes and the contributions of each player to each of the outcomes (step 740). As will be appreciated, the outcome is not limited to the outcome of the escape room game as a whole but can be the outcome of any other gaming event that is the subject of a wager. As noted, common gaming events that are the subject of a wager include a predicted level of performance of one or more of the players. Examples of metrics or measures for the predicted level of performance include a time to complete a selected puzzle, a time required to complete a plurality of puzzles or the escape room game as a whole, and a number of attempts to solve a selected puzzle or plurality of puzzles.

The method continues by the gaming device 112 or gaming server 116 determining awards based on wagers and outcomes and updating a credit meter accordingly (step 744).

In various embodiments in which the gaming system includes a plurality of gaming devices 312, the gaming devices are configured to communicate with one another to provide a group gaming environment. In certain such embodiments, the gaming devices enable players of those gaming devices to work in conjunction with one another, such as by enabling the players to play together as a team or group, to win one or more awards. In other such embodiments, the gaming devices enable players of those gaming devices to compete against one another for one or more awards. In one such embodiment, the gaming devices enable the players of those gaming devices to participate in one or more gaming tournaments for one or more awards.

In various embodiments, the gaming system or gaming device includes one or more player tracking systems. Such player tracking systems enable operators of the gaming system or gaming device (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the gaming device to begin a game, the card reader reads the player identification number off the player tracking card to identify the player. The gaming device timely tracks any suitable information or data relating to the identified player's game and updates the player profile or game event information in the databases 184. The gaming device also timely tracks when the player tracking card is removed to conclude play for that game. In another embodiment, rather than requiring insertion of a player tracking card into the card reader, the gaming device utilizes one or more portable devices, such as a mobile phone, a radio frequency identification tag, or any other suitable wireless device, to track when a game begins and ends. In another embodiment, the gaming device utilizes any suitable biometric technology or ticket technology to track when a game begins and ends.

In such embodiments, during one or more games, the gaming device tracks, as event information, any suitable information or data, such as any amounts wagered, average wager amounts, and/or the time at which these wagers are placed. In different embodiments, for one or more players, the player tracking system and player profile includes the player's account number, the player's card number, the player's first name, the player's surname, the player's preferred name, the player's player tracking ranking, any promotion status associated with the player's player tracking card, the player's address, the player's birthday, the player's anniversary, the player's recent games, or any other suitable data.

Certain of the gaming systems described herein, including gaming devices located in a casino or another gaming establishment, include certain components and/or are configured to operate in certain manners that differentiate these gaming devices and systems from general purpose computing devices (i.e., certain personal gaming devices such as desktop computers and laptop computers).

For instance, gaming devices are highly regulated to ensure fairness and, in many cases, gaming devices, such as gaming devices 112, are configured to award monetary awards up to multiple millions of dollars. To satisfy security and regulatory requirements in a gaming environment, hardware and/or software architectures are implemented in EGMs that differ significantly from those of general-purpose computing devices. For purposes of illustration, a description of gaming devices relative to general-purpose computing devices and some examples of these additional (or different) hardware and/or software architectures found in gaming devices are described herein.

At first glance, one might think that adapting general-purpose computing device technologies to the gaming industry and gaming devices would be a simple proposition because both general purpose computing devices and gaming devices employ processors that control a variety of devices. However, due to at least: (1) the regulatory requirements placed on gaming devices, (2) the harsh environment in which gaming devices operate, (3) security requirements, and (4) fault tolerance requirements, adapting general purpose computing device technologies to gaming devices can be quite difficult. Further, techniques and methods for solving a problem in the general-purpose computing device industry, such as device compatibility and connectivity issues, might not be adequate in the gaming industry. For instance, a fault or a weakness tolerated in a general-purpose computing device, such as security holes in software or frequent crashes, is not tolerated in a gaming device because in a gaming device these faults can lead to a direct loss of funds from the gaming device, such as stolen cash or loss of revenue when the gaming device is not operating properly or when the random outcome determination is manipulated.

Certain differences between general-purpose computing devices and gaming devices are described below. A first difference between gaming devices and general-purpose computing devices is that gaming devices are state-based systems. A state-based system stores and maintains its current state in a non-volatile memory such that, in the event of a power failure or other malfunction, the state-based system can return to that state when the power is restored or the malfunction is remedied. For instance, for a state-based gaming device, if the gaming device displays an award for a game of chance but the power to the gaming device fails before the gaming device provides the award to the player, the gaming device stores the pre-power failure state in a non-volatile memory, returns to that state upon restoration of power, and provides the award to the player. This requirement affects the software and hardware design on gaming devices. General-purpose computing devices are typically not state-based machines, and a majority of data can be lost when a malfunction occurs on a general-purpose computing device.

A second difference between gaming devices and general-purpose computing devices is that, for regulatory purposes, the software on the gaming device utilized to operate the gaming device has been designed to be static and monolithic to prevent cheating by the operator of the gaming device. For instance, one solution that has been employed in the gaming industry to prevent cheating and to satisfy regulatory requirements has been to manufacture a gaming device that can use a proprietary processor running instructions to provide the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the gaming device in the presence of a gaming regulator. Regardless of whether the EPROM solution is used, to gain approval in most gaming jurisdictions, a gaming device must demonstrate sufficient safeguards that prevent an operator or a player of a gaming device from manipulating the gaming device's hardware and software in a manner that gives him an unfair, and in some cases illegal, advantage.

A third difference between gaming devices and general-purpose computing devices is authentication-gaming devices storing code are configured to authenticate the code to determine if the code is unaltered before executing the code. If the code has been altered, the gaming device prevents the code from being executed. The code authentication requirements in the gaming industry affect both hardware and software designs on gaming devices. Certain gaming devices use hash functions to authenticate code. For instance, one gaming device stores game program code, a hash function, and an authentication hash (which may be encrypted). Before executing the game program code, the gaming device hashes the game program code using the hash function to obtain a result hash and compares the result hash to the authentication hash. If the result hash matches the authentication hash, the gaming device determines that the game program code is valid and executes the game program code. If the result hash does not match the authentication hash, the gaming device determines that the game program code has been altered (i.e., may have been tampered with) and prevents execution of the game program code.

A fourth difference between gaming devices and general-purpose computing devices is that gaming devices have unique peripheral device requirements that differ from those of a general-purpose computing device, such as peripheral device security requirements not usually addressed by general-purpose computing devices. For instance, monetary devices, such as coin dispensers, bill validators, and ticket printers and computing devices that are used to govern the input and output of cash or other items having monetary value (such as tickets) to and from a gaming device have security requirements that are not typically addressed in general purpose computing devices. Therefore, many genera-purpose computing device techniques and methods developed to facilitate device connectivity and device compatibility do not address the emphasis placed on security in the gaming industry.

To address some of the issues described above, a number of hardware/software components and architectures are utilized in EGMs and EGTs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain gaming devices use a watchdog timer to provide a software failure detection mechanism. In a normally-operating gaming device, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain gaming devices use several power supply voltages to operate portions of the computer circuitry. These can be generated in a central power supply or locally on the computer board. If any of these voltages falls out of the tolerance limits of the circuitry they power, unpredictable operation of the gaming device may result. Though most modern general purpose computing devices include voltage monitoring circuitry, these types of circuits only report voltage status to the operating software. Out of tolerance voltages can cause software malfunction, creating a potential uncontrolled condition in the general purpose computing device. Certain gaming devices have power supplies with relatively tighter voltage margins than that required by the operating circuitry. In addition, the voltage monitoring circuitry implemented in certain gaming devices typically has two thresholds of control. The first threshold generates a software event that can be detected by the operating software and an error condition then generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the gaming device.

As described above, certain gaming devices are state-based machines. Different functions of the game provided by the gaming device (e.g., bet, play, result, points in the graphical presentation, etc.) may be defined as a state. When the gaming device moves a game from one state to another, the gaming device stores critical data regarding the game software in a custom non-volatile memory subsystem. This ensures that the player's wager and credits are preserved and to minimize potential disputes in the event of a malfunction on the gaming device. In general, the gaming device does not advance from a first state to a second state until critical information that enables the first state to be reconstructed has been stored. This feature enables the gaming device to recover operation to the current state of play in the event of a malfunction, loss of power, etc. that occurred just prior to the malfunction. In at least one embodiment, the gaming device is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

To ensure the success of atomic transactions relating to critical information to be stored in the gaming device memory before a failure event (e.g., malfunction, loss of power, etc.), memory that includes one or more of the following criteria be used: direct memory access capability; data read/write capability which meets or exceeds minimum read/write access characteristics (such as at least 5.08 Mbytes/sec (Read) and/or at least 38.0 Mbytes/sec (Write)). Memory devices that meet or exceed the above criteria may be referred to as "fault-tolerant" memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve gaming device critical data, although other types of non-volatile memory devices may be employed. These memory devices are typically not used in typical general purpose computing devices.

Thus, in at least one embodiment, the gaming device is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of gaming device critical information) within a time period of 200 milliseconds or less. In at least one embodiment, the time period of 200 milliseconds represents a maximum amount of time for which sufficient power may be available to the various gaming device components after a power outage event has occurred at the gaming device.

As described previously, the gaming device may not advance from a first state to a second state until critical information that enables the first state to be reconstructed has been atomically stored. After the state of the gaming device is restored during the play of a game of chance, game play may resume and the game may be completed in a manner that is no different than if the malfunction had not occurred. Thus, for example, when a malfunction occurs during a game of chance, the gaming device may be restored to a state in the game of chance just prior to when the malfunction occurred. The restored state may include metering information and graphical information that was displayed on the gaming device in the state prior to the malfunction. For example, when the malfunction occurs during the play of a card game after the cards have been dealt, the gaming device may be restored with the cards that were previously displayed as part of the card game. As another example, a bonus game may be triggered during the play of a game of chance in which a player is required to make a number of selections on a video display screen. When a malfunction has occurred after the player has made one or more selections, the gaming device may be restored to a state that shows the graphical presentation just prior to the malfunction including an indication of selections that have already been made by the player. In general, the gaming device may be restored to any state in a plurality of states that occur in the game of chance that occurs while the game of chance is played or to states that occur between the play of a game of chance.

Game history information regarding previous games played such as an amount wagered, the outcome of the game, and the like may also be stored in a non-volatile memory device, such as the databases 186. The information stored in the non-volatile memory may be detailed enough to reconstruct a portion of the graphical presentation that was previously presented on the gaming device and the state of the gaming device (e.g., credits) at the time the game of chance was played. The game history information may be utilized in the event of a dispute. For example, a player may decide that in a previous game of chance that they did not receive credit for an award that they believed they won. The game history information may be used to reconstruct the state of the gaming device prior to, during, and/or after the disputed game to demonstrate whether the player was correct or not in her assertion.

Another feature of gaming devices is that they often include unique interfaces, including serial interfaces, to connect to specific subsystems internal and external to the gaming device. The serial devices may have electrical interface requirements that differ from the "standard" EIA serial interfaces provided by general purpose computing devices. These interfaces may include, for example, Fiber Optic Serial, optically coupled serial interfaces, current loop style serial interfaces, etc. In addition, to conserve serial interfaces internally in the gaming device, serial devices may be connected in a shared, daisy-chain fashion in which multiple peripheral devices are connected to a single serial channel.

The serial interfaces may be used to transmit information using communication protocols that are unique to the gaming industry. For example, IGT's Netplex is a proprietary communication protocol used for serial communication between gaming devices. As another example, SAS is a communication protocol used to transmit information, such as metering information, from a gaming device to a remote device. Often SAS is used in conjunction with a player tracking system.

Certain gaming devices may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into a gaming device by monitoring security switches attached to access doors in the gaming device cabinet. Access violations result in suspension of game play and can trigger additional security operations to preserve the current state of game play. These circuits also function when power is off by use of a battery backup. In power-off operation, these circuits continue to monitor the access doors of the gaming device. When power is restored, the gaming device can determine whether any security violations occurred while power was off, e.g., via software for reading status registers. This can trigger event log entries and further data authentication operations by the gaming device software.

Trusted memory devices and/or trusted memory sources are included in a gaming device to ensure the authenticity of the software that may be stored on less secure memory subsystems, such as mass storage devices. Trusted memory devices and controlling circuitry are typically designed to not enable modification of the code and data stored in the memory device while the memory device is installed in the gaming device. The code and data stored in these devices may include authentication algorithms, random number generators, authentication keys, operating system kernels, etc. The purpose of these trusted memory devices is to provide gaming regulatory authorities a root trusted authority within the computing environment of the gaming device that can be tracked and verified as original. This may be accomplished via removal of the trusted memory device from the gaming device computer and verification of the secure memory device contents is a separate third party verification device. Once the trusted memory device is verified as authentic, and based on the approval of the verification algorithms included in the trusted device, the gaming device is enabled to verify the authenticity of additional code and data that may be located in the gaming computer assembly, such as code and data stored on hard disk drives.

In at least one embodiment, at least a portion of the trusted memory devices/sources may correspond to memory that cannot easily be altered (e.g., "unalterable memory") such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities.

EGMs and EGTs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

Mass storage devices used in a general purpose computing devices typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, gaming devices that include mass storage devices include hardware level mass storage data protection circuitry that operates at the circuit level to monitor attempts to modify data on the mass storage device and will generate both software and hardware error triggers should a data modification be attempted without the proper electronic and physical enablers being present.

It should further be appreciated that the gaming device of the present disclosure may have varying or alternative housing configurations.

It should further be appreciated that the gaming device of the present disclosure may have varying or alternative display device configurations.

In various embodiments, the gaming device of the present disclosure is configured to be positioned on a base or stand.

It should be appreciated that the enhanced physical player interaction provided by the present disclosure, in addition to being implemented in a gaming device configured to be located on a casino floor, can be implemented in one or more personal gaming devices, such as desktop computers, laptop computers, tablet computers or computing devices, personal digital assistants, mobile phones, and other mobile computing devices.

Various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

As will be appreciated by one skilled in the art, aspects of the present disclosure may be illustrated and described herein in any of a number of patentable classes or circumstances including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the disclosure of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The present disclosure, in various embodiments, includes components, methods, processes, systems and/or apparatus substantially as depicted and described herein, including various embodiments, subcombinations, and subsets thereof. Those of skill in the art will understand how to make and use the present disclosure after understanding the present disclosure. The present disclosure, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing detailed description for example, various features of the disclosure are grouped together in one or more embodiments for the purpose of streamlining the disclosure. The features of the embodiments of the disclosure may be combined in alternate embodiments other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this detailed description, with each claim standing on its own as a separate preferred embodiment of the disclosure.

Moreover, though the description of the disclosure has included description of one or more embodiments and certain variations and modifications, other variations, combinations, and modifications are within the scope of the disclosure, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method, comprising:

initiating, by a gaming system, a game comprising a plurality of puzzles corresponding to different solutions to be solved by at least first and second players, wherein the at least first and second players solve the plurality of puzzles in a room with defined boundaries;

determining, by the gaming system from a plurality of spatially distributed context sensors in the defined boundaries, a game input of each of the at least first and second players, each game input comprising metadata describing a respective game input, an identity of the corresponding first or second player, and a timestamp when the game input was received;

determining, by the gaming system from the plurality of spatially distributed context sensors, a timestamp when each of a plurality of puzzles was solved;

comparing, by the gaming system, each of the game inputs with each of the timestamps when each of the plurality of puzzles was solved;

determining, by the gaming system from the comparing, an actual level of performance of each of the first and second players in solving the at least a first puzzle;

determining, by the gaming system, an award to a winning one of the first and second players based on comparing the actual level of performance of each of the first and second players in solving at least a first puzzle; and adjusting, by the gaming system, a value in an electronic record associated with an account of the winning one of the first and second players to reflect the award.

2. The method of claim 1, wherein the game is an escape room game and wherein play of a first puzzle of the plurality of puzzles depends upon a prior successful solution of a second puzzle by the at least first and second players and further comprising:

streaming to first and second third party devices video of the at least first and second players during the escape room game;

receiving, by the gaming system and from a first third party device, a first electronic message comprising a first indication of consideration by a first party for occurrence of a first predicted level of performance of the first player in solving at least a first puzzle of the plurality of puzzles;

receiving, by the gaming system and from a second third party device, a second electronic message comprising a second indication of consideration by a second party for occurrence of a second predicted level of performance of the first player solving the at least a first puzzle, wherein the first and second predicted levels of performance are different and comprise one or more of a time required to solve the at least a first puzzle and a number of attempts required to solve the at least a first puzzle;

determining, by the gaming system, an award to a winning one of the first party and second party based on comparing the first and second predicted levels of performance in the first and second electronic messages and the actual level of performance of the first player in solving the at least a first puzzle; and adjusting, by the gaming system, a value in an electronic record associated with an account of the winning one of the first party and second party to reflect the award to the winning one of the first party and second party.

3. The method of claim 2, wherein the determining is performed at a conclusion of the escape room game, wherein the room is one or more of a virtual room, a physical room, and a mixed reality room, wherein the at least first and second players has restricted access from the defined boundaries during the escape room game, and further comprising:

establishing, by the gaming system, a predetermined period of time in which the at least first and second players is required to solve the plurality of puzzles; and selecting, by the gaming system, each of the plurality of puzzles from a set of puzzles, each of the puzzles comprising a corresponding solution for puzzle completion, a credit amount associated with puzzle completion, a predetermined period of time for puzzle completion, and a difficulty level of the respective puzzle, wherein the credit amount and predetermined period of time for puzzle completion are directly related to the difficulty level of the respective puzzle.

4. The method of claim 3, wherein each of the first and second indications of consideration comprises a wager, wherein each of the at least first and second players corresponds to a player profile, the player profile comprising an overall score corresponding to a rank of a corresponding one of the at least first and second players, wherein the restricted access from the defined boundaries during the escape room game comprises an electromechanical lock, and further comprising:

pairing, by a gaming device, with a mobile device of a selected player of a plurality of players comprising the first and second players;

receiving, by the gaming device, user input from the selected player to perform an activity in the escape room game;

in response, performing, by the gaming system and on behalf of the selected player, the activity in the escape room game; and determining an overall score for the plurality of players as a function of the overall score of each of the plurality of players.

5. The method of claim 1, wherein each of the at least first and second players has restricted access from the defined boundaries during the game, wherein the plurality of puzzles must be completed in a specific order for the restricted access to be removed, and further comprising:

adjusting, during the game, a difficulty level and payout table of the at least a first puzzle based on a monitored level of performance of each of the at least first and second players in solving the at least a first puzzle.

6. The method of claim 1, wherein each of the at least first and second players corresponds to a player profile, the player profile comprising an overall score corresponding to a rank of a corresponding one of the at least first and second players and further comprising:

during the game, providing, by the gaming system, a hint to the at least first and second players to solve the at least a first puzzle; and adjusting a difficulty level of the at least a first puzzle based on a prior interaction of a different player with the at least a first puzzle.

7. The method of claim 1, wherein each of the at least first and second players corresponds to a player profile, the player profile comprising an overall score corresponding to a rank of a corresponding one of the at least first and second players, and further comprising:

adjusting, by the gaming system, a difficulty level of the at least a first puzzle and payout table based on the overall score of the at least first and second players; and adjusting an award amount based on the overall score of each of the at least first and second players.

8. The method of claim 1, further comprising:

determining a relative contribution of each of the at least first and second players to completing the at least a first puzzle, wherein an award of each player of the at least first and second players is based on a relative contribution of the corresponding player of the at least first and second players to completing the at least a first puzzle; and wherein the initiating comprises:

selecting a game element of a plurality of game elements, each of the game elements of the plurality of game elements comprising a set of inputs that determines a difficulty measure for a respective game element; and based on a target difficulty level for the at least a first puzzle and a selected theme for the game, assembling a plurality of game elements to form the at least a first puzzle.

9. A system, comprising:

a processor;

a plurality of spatially distributed context sensors, coupled with the processor, to sense one or more parameters related to player activity; and a computer-readable storage medium, coupled with the processor, comprising processor-executable instructions that, when executed by the processor, cause the processor to:

receive, during a game, location signals from a signal emitter carried by each of a plurality of players;

determine, at a selected time and from the received location signals, a spatial position of each of the plurality of players in a defined spatial area and one or more game objects relative to a coordinate system;

based on the sensed one or more parameters and the determined spatial position of each of the plurality of players at the selected time relative to a spatial position of the one or more game objects, identify separate game inputs of each player of the plurality of players;

based on the identified separate game inputs, determine a relative contribution of each player to solving at least a first puzzle of a plurality of puzzles, wherein a first predicted level of performance is associated with the relative contribution of a first player of the plurality of players;

determine an award to the first player based on comparing the relative contribution of the first player to the first predicted level of performance; and adjust a value in an electronic record associated with an account of the first player to reflect the award.

10. The system of claim 9, wherein the game is an escape room game and wherein the processor-executable instructions, when executed by the processor, cause the processor to:

provide the escape room game, the escape room game comprising the plurality of puzzles corresponding to different solutions to be solved by the plurality of players in a specific order for successful completion of the escape room game, and wherein the plurality of players solve the plurality of puzzles in a room with defined boundaries comprising the defined spatial area, the room comprising one or more game objects associated with the escape room game;

receive an electronic message comprising an indication of consideration for occurrence of the first predicted level of performance of the first player of the plurality of players in the escape room game;

initiate the escape room game;

determine an award based on the indication of consideration in the electronic message and a comparison of the first predicted level of performance and relative contribution of the first player in solving the at least a first puzzle; and adjust a value in an electronic record associated with an account of the first player to reflect the award.

11. The system of claim 10, wherein the room is one or more of a virtual room, a physical room, and a mixed reality room, wherein a player of the plurality of players has restricted access from the defined spatial area during the game, wherein play of the at least a first puzzle of the plurality of puzzles depends upon a prior successful solution of a second puzzle by the player, wherein the plurality of puzzles must be completed in the specific order for the restricted access to be removed, wherein the determining of a relative contribution is performed at a conclusion of the game, and wherein the processor-executable instructions, when executed by the processor, cause the processor to:

establish a predetermined period of time in which the plurality of players are required to solve the plurality of puzzles;

select each of the plurality of puzzles from a set of puzzles, each of the puzzles comprising a corresponding solution for puzzle completion, a credit amount associated with puzzle completion, a predetermined period of time for puzzle completion, and a difficulty level of the respective puzzle, wherein the credit amount and predetermined period of time for puzzle completion are directly related to the difficulty level of the respective puzzle; and associating each identified separate game input with corresponding metadata describing the identified separate game input, an identity of a corresponding player responsible for the identified separate game input, and a corresponding timestamp associated with the identified separate game input.

12. The system of claim 10, wherein the first player corresponds to a first player profile comprising an overall score corresponding to a rank of the first player, wherein each of the plurality of players has restricted access from the defined spatial area during the game, wherein the restricted access from the defined spatial area during the game comprises an electromechanical lock, wherein the indication of consideration for occurrence of a first predicted level of performance of the first player in the game comprises a wager, and wherein the processor-executable instructions, when executed by the processor, cause the processor to:

pair with a mobile device of a selected player;

receive user input from the selected player to perform an activity in the game;

in response, perform, on behalf of the selected player, the activity in the game; and determine an overall score for the plurality of players as a function of the overall score of each of the plurality of players.

13. The system of claim 9, wherein the plurality of players have restricted access from the defined spatial area during the game, wherein the plurality of puzzles must be completed in a specific order for the restricted access to be removed, and wherein the processor-executable instructions, when executed by the processor, cause the processor to:

stream to a third party device video of the plurality of players during the game; and receive, from the third party device, a wager regarding occurrence of a second predicted level of performance of the first player in the game, wherein the first and second predicted levels of performance are different and comprise one or more of a time to complete the at least a first puzzle of the plurality of puzzles, a time required to complete the plurality of puzzles for the restricted access to be removed, and a number of attempts to solve the at least a first puzzle.

14. The system of claim 9, wherein the processor comprises a plurality of processors, wherein the first player corresponds to a first player profile comprising an overall score corresponding to a rank of the first player and wherein the processor-executable instructions, when executed by the processor, cause the processor to:

during the game, provide a hint to the plurality of players to solve the at least a first puzzle of the plurality of puzzles; and adjust a difficulty level of the at least a first puzzle based on a prior interaction of a different player with a selected puzzle.

15. The system of claim 9, wherein the first player corresponds to a first player profile comprising an overall score corresponding to a rank of the first player, and wherein the processor-executable instructions, when executed by the processor, cause the processor to:

adjust a difficulty level and an award payout table of at least a first puzzle based on the overall score of the first player; and adjust an award amount based on the overall score of the first player.

16. The system of claim 9, wherein the processor-executable instructions, when executed by the processor, cause the processor to:

select a game element of a plurality of game elements, each of the game elements of the plurality of game elements comprising a set of inputs that determines a difficulty measure for a respective game element; and based on a target difficulty level for a selected puzzle and a selected theme for the game, assemble a plurality of game elements to form the at least a first puzzle.

17. A server, comprising:

a communication interface that facilitates machine-to-machine communications with a plurality of gaming devices;

a random number generator to generate a random output;

a processor coupled to the communication interface and random number generator; and a computer-readable storage medium, coupled with the processor, comprising instructions that are executable by the processor, wherein the instructions comprise:

determine, from a plurality of context sensors spatially distributed within an area having defined boundaries and during a game, a game input of each of at least first and second players, each game input comprising metadata describing the respective game input, an identity of the corresponding first or second player, and a timestamp when the game input was received;

receive location signals from a signal emitter carried by each of the first and second players;

determine, at a selected time and from the received location signals, a spatial position of each of the first and second players in the area and one or more game objects relative to a coordinate system;

determine, from the plurality of spatially distributed context sensors, a timestamp when each of a plurality of puzzles was solved;

based on the game inputs and the determined spatial position of each of the first and second players at the respective timestamp when each of the plurality of puzzles was solved, an actual level of performance of each of the first and second players in solving each of the plurality of puzzles;

based on the actual level of performance, determining a winning one of the first and second players; and adjusting a value in an electronic record to reflect an award to the winning one of the first and second players.

18. The server of claim 17, wherein the game comprises an escape room game and wherein the instructions, when executed by the processor, cause the processor to:

provide, to a selected gaming device of the plurality of gaming devices, the escape room game, the escape room game comprising a plurality of puzzles corresponding to different solutions to be solved by at least first and second players in a specific order and within a predetermined period of time for successful completion of the escape room game, and wherein the at least first and second players solve the plurality of puzzles in a room with defined boundaries and restricted access, the room comprising one or more game objects associated with the escape room game;

receive, from the selected gaming device, an electronic message comprising an indication of consideration for occurrence of a first predicted level of performance of the first player in the escape room game;

cause the selected gaming device to initiate the escape room game;

alter a game parameter of at least a first puzzle in the plurality of puzzles in the escape room game based on the random output, the altered game parameter adjusting a difficulty level associated with solving the at least a first puzzle; and adjust a value in an electronic record associated with an account of the first player to reflect an award based on the indication of consideration in the electronic message and an actual level of performance of each of the at least first and second players in solving one or more of the plurality of puzzles, wherein play of a first puzzle of the plurality of puzzles depends upon a prior successful solution of a second puzzle by the at least first and second players, and wherein the plurality of puzzles must be completed in the specific order for the restricted access to be removed.

19. The server of claim 17, wherein the instructions, when executed by the processor, cause the processor to:

select each of the plurality of puzzles from a set of puzzles, each of the plurality of puzzles comprising a corresponding solution for puzzle completion, a credit amount associated with puzzle completion, a predetermined period of time for puzzle completion, and a difficulty level of the respective puzzle, wherein the credit amount and predetermined period of time for puzzle completion are directly related to the difficulty level of the respective puzzle; and determine a relative contribution of each of the at least first and second players to solving each of the plurality of puzzles, wherein an award of each player is based on a relative contribution of the respective player to completing each of the plurality of puzzles, wherein each of the first and second players has restricted access from the defined boundaries during the game, wherein the restricted access from the area having the defined boundaries during the game comprises an electromechanical lock;

receive, via a selected gaming device, user input from a selected player of the first and second players to perform an activity in the game;

in response, perform, on behalf of the selected player, the activity in the game; and determine an overall score for the first and second players as a function of the overall score of each of the first and second players.

20. The server of claim 18, wherein the processor comprises a plurality of processors, wherein the first player corresponds to a first player profile comprising an overall score corresponding to a rank of the first player, wherein the altering of the game parameter occurs dynamically during the game in response to the at least first and second players, wherein each of the at least first and second players corresponds to a layer profile comprising an overall score corresponding to a rank of the corresponding at least first and second players and wherein the instructions, when executed by the processor, cause the processor to:

during the game, provide a hint to the at least first and second players to solve a selected puzzle of the plurality of puzzles;

adjust a difficulty level of a selected puzzle based on a prior interaction of a different player with the selected puzzle;

adjust a difficulty level of a selected puzzle based on the overall score of the first player; and adjust an award amount based on the overall score of the first player.

* * * * *